United States Patent
Reiter et al.

(10) Patent No.: US 8,495,312 B2
(45) Date of Patent: Jul. 23, 2013

(54) SYSTEM AND METHOD FOR IDENTIFYING LOCATIONS WITHIN DATA

(75) Inventors: Timmie G. Reiter, Westborough, MA (US); Carey Jay McMaster, Stow, MA (US); Ronald Ray Trimble, Acton, MA (US); Stefan Merrill King, Belmont, MA (US); David Michael Biernacki, Woonsocket, RI (US); Jon Christopher Kennedy, Marlborough, MA (US)

(73) Assignee: Sepaton, Inc., Marlborough, MA (US)

( * ) Notice: Subject to any disclaimer, the term of this patent is extended or adjusted under 35 U.S.C. 154(b) by 302 days.

(21) Appl. No.: 12/877,725

(22) Filed: Sep. 8, 2010

(65) Prior Publication Data

US 2011/0185133 A1 Jul. 28, 2011

Related U.S. Application Data

(60) Provisional application No. 61/298,025, filed on Jan. 25, 2010.

(51) Int. Cl.
*G06F 12/00* (2006.01)

(52) U.S. Cl.
USPC .......................................... 711/156; 711/108

(58) Field of Classification Search
USPC ................................. 711/156, 108
See application file for complete search history.

(56) References Cited

U.S. PATENT DOCUMENTS

| | | | |
|---|---|---|---|
| 5,276,860 A | 1/1994 | Fortier et al. | |
| 5,403,639 A | 4/1995 | Belsan et al. | |
| 5,990,810 A | 11/1999 | Williams | |
| 6,101,472 A | 8/2000 | Giangarra et al. | |
| 6,366,986 B1 | 4/2002 | St. Pierre et al. | |
| 6,385,706 B1 | 5/2002 | Ofek et al. | |
| 6,477,544 B1 | 11/2002 | Bolosky et al. | |
| 6,542,906 B2 | 4/2003 | Korn | |
| 6,704,730 B2 | 3/2004 | Moulton et al. | |
| 6,714,952 B2 | 3/2004 | Dunham et al. | |
| 6,779,095 B2 | 8/2004 | Selkirk et al. | |

(Continued)

FOREIGN PATENT DOCUMENTS

| | | |
|---|---|---|
| EP | 0774715 A1 | 5/1997 |
| KR | 1020060073724 | 6/2006 |
| WO | 2005017686 A2 | 2/2005 |
| WO | 2005033945 A1 | 4/2005 |

OTHER PUBLICATIONS

International Search Report from corresponding International Application No. PCT/US2011/022236 (dated Feb. 17, 2012), 12 pages.

(Continued)

*Primary Examiner* — Hashem Farrokh
(74) *Attorney, Agent, or Firm* — Lando & Anastasi, LLP

(57) ABSTRACT

Described are computer-based methods and apparatuses, including computer program products, for removing redundant data from a storage system. In one example, a data delineation process delineates data targeted for de-duplication into regions using a plurality of markers. The de-duplication system determines which of these regions should be subject to further de-duplication processing by comparing metadata representing the regions to metadata representing regions of a reference data set. The de-duplication system identifies an area of data that incorporates the regions that should be subject to further de-duplication processing and de-duplicates this area with reference to a corresponding area within the reference data set.

20 Claims, 14 Drawing Sheets

U.S. PATENT DOCUMENTS

| | | | |
|---|---|---|---|
| 6,795,819 B2 | 9/2004 | Wheeler et al. | |
| 6,889,297 B2 | 5/2005 | Krapp et al. | |
| 7,024,427 B2 | 4/2006 | Bobbitt et al. | |
| 7,055,008 B2 | 5/2006 | Niles et al. | |
| 7,065,619 B1 | 6/2006 | Zhu et al. | |
| 7,116,249 B2 | 10/2006 | McCanne et al. | |
| 7,146,476 B2 | 12/2006 | Sandorfi et al. | |
| 7,155,585 B2 | 12/2006 | Lam et al. | |
| 7,181,373 B2 | 2/2007 | Le Cocq et al. | |
| 7,251,680 B2 | 7/2007 | DeVos | |
| 7,373,603 B1 | 5/2008 | Yalovsky et al. | |
| 7,430,647 B2 | 9/2008 | Sandorfi et al. | |
| 7,457,934 B2 | 11/2008 | Yagawa | |
| 7,472,242 B1 | 12/2008 | Deshmukh et al. | |
| 7,552,358 B1 | 6/2009 | Asgar-Deen et al. | |
| 7,555,755 B2 | 6/2009 | Fairweather | |
| 7,590,808 B2 | 9/2009 | Lam et al. | |
| 7,822,725 B2 | 10/2010 | Walliser et al. | |
| 7,962,499 B2 | 6/2011 | Lam | |
| 8,121,993 B2 | 2/2012 | Blount et al. | |
| 8,140,821 B1 | 3/2012 | Raizen et al. | |
| 8,156,306 B1 | 4/2012 | Raizen et al. | |
| 8,280,926 B2 | 10/2012 | Sandorfi et al. | |
| 8,285,690 B2 | 10/2012 | Nakamura et al. | |
| 2002/0059505 A1 | 5/2002 | St. Pierre et al. | |
| 2002/0091710 A1 | 7/2002 | Dunham et al. | |
| 2003/0074378 A1 | 4/2003 | Midgley et al. | |
| 2003/0105912 A1 | 6/2003 | Noren | |
| 2003/0145248 A1 | 7/2003 | McNeil | |
| 2003/0158831 A1 | 8/2003 | Zaremba | |
| 2003/0177149 A1 | 9/2003 | Coombs | |
| 2005/0108486 A1 | 5/2005 | Sandorfi | |
| 2005/0193235 A1 | 9/2005 | Sandorfi et al. | |
| 2006/0059207 A1 | 3/2006 | Hirsch et al. | |
| 2007/0050423 A1 | 3/2007 | Whalen et al. | |
| 2007/0101074 A1 | 5/2007 | Patterson | |
| 2007/0255758 A1 | 11/2007 | Zheng et al. | |
| 2008/0016131 A1 | 1/2008 | Sandorfi et al. | |
| 2008/0028007 A1 | 1/2008 | Ishii et al. | |
| 2008/0034017 A1 | 2/2008 | Giampaolo et al. | |
| 2008/0082310 A1 | 4/2008 | Sandorfi et al. | |
| 2008/0184001 A1 | 7/2008 | Stager | |
| 2008/0243914 A1 | 10/2008 | Prahlad et al. | |
| 2008/0275911 A1 | 11/2008 | Sandorfi et al. | |
| 2008/0294696 A1 | 11/2008 | Frandzel | |
| 2008/0301134 A1* | 12/2008 | Miller et al. | 707/6 |
| 2009/0172326 A1 | 7/2009 | Sandorfi | |
| 2009/0177661 A1 | 7/2009 | Sandorfi et al. | |
| 2009/0193219 A1* | 7/2009 | Ohira et al. | 711/170 |
| 2009/0300321 A1 | 12/2009 | Balachandran et al. | |
| 2009/0307251 A1 | 12/2009 | Heller et al. | |
| 2010/0017487 A1* | 1/2010 | Patinkin | 709/206 |
| 2010/0088296 A1* | 4/2010 | Periyagaram et al. | 707/705 |
| 2010/0188273 A1 | 7/2010 | He et al. | |
| 2010/0198797 A1 | 8/2010 | Wideman | |
| 2011/0016095 A1 | 1/2011 | Anglin et al. | |
| 2011/0022989 A1 | 1/2011 | Lin et al. | |
| 2011/0099200 A1 | 4/2011 | Blount et al. | |
| 2011/0184921 A1 | 7/2011 | Reiter et al. | |
| 2011/0184966 A1 | 7/2011 | Reiter et al. | |
| 2011/0184967 A1 | 7/2011 | Reiter et al. | |
| 2011/0273982 A1 | 11/2011 | Akirav et al. | |
| 2011/0307447 A1 | 12/2011 | Sabaa et al. | |
| 2012/0166448 A1 | 6/2012 | Li et al. | |
| 2012/0191669 A1 | 7/2012 | Kennedy et al. | |
| 2012/0191670 A1 | 7/2012 | Kennedy et al. | |

OTHER PUBLICATIONS

Meiri et al., "Parallel Compression of Correlated Files," 2007 IEEE International Conference on Cluster Computing, (Sep. 2007), pp. 285-292.

Bhagwat et al. "Extreme Binning: Scalable, Parallel Deduplication for Chunk-based File Backup". 2009.

Zhu et al. "Avoiding the Disk Bottleneck in the Data Domain Deduplication File System". 2008.

Bhagwat et al. "Extreme Binning: Scalable, Parallel Deduplication for Chunk-based File Backup". originally published in the Proceedings of the 17th IEEE/ACM International Symposium on Modelling, Analysis and Simulation of Computer and Telecommunication Systems, (MASCOTS' 2009) London, UK, Sep. 21-23, 2009.

Zhu et al. "Avoiding the Disk Bottleneck in the Data Domain Deduplication File System". FAST '08 6th USENIX Conference on File and Storage Technologies. San Jose, CA, Feb. 26-29, 2008.

* cited by examiner

SYSTEM AND METHOD FOR IDENTIFYING LOCATIONS WITHIN DATA

RELATED APPLICATIONS

This application claims priority under 35 U.S.C. §119(e) to U.S. Provisional Application Ser. No. 61/298,025, entitled "SYSTEM AND METHOD FOR DATA DRIVEN DE-DUPLICATION," filed on Jan. 25, 2010, the disclosure of which is hereby incorporated herein by reference in its entirety.

This application relates to and is assigned to the same entity as the co-pending applications, entitled "System and Method for Data Driven De-Duplication," U.S. patent application Ser. No. 12/877,719, entitled "System and Method for Summarizing Data," U.S. patent application Ser. No. 12/877,731, and entitled "System and Method for Navigating Data," U.S. patent application Ser. No. 12/877,735, all filed on Sep. 8, 2010, the disclosure of which are hereby incorporated herein by reference in their entirety.

FIELD OF THE INVENTION

Aspects of the present invention relate to data storage, and more particularly to apparatus and methods for providing data driven de-duplication services.

BACKGROUND

Given the costs associated with conventional tape libraries and other sorts of back-up storage media, storage system vendors often incorporate de-duplication processes into their product offerings to decrease the amount of required back-up media. De-duplication is a process of identifying repeating sequences of data and preventing or removing redundant storage of the repeating sequences of data. De-duplication is typically implemented as a function of a target device, such as a back-up storage device. The act of identifying redundant data within back-up data streams is complex, and in the current state-of-the-art, is conventionally solved using either hash fingerprinting or pattern recognition.

In hash fingerprinting, the incoming data stream first undergoes an alignment process (which attempts to predict good "breakpoints," also known as edges, in the data stream that will provide the highest probability of subsequent matches) and then is subject to a hashing process (usually SHA-1 or SHA-2 in the current state-of-the-art). The data stream is broken into chunks (usually about 8 kilobytes-12 kilobytes in size) by the hashing process; each chunk is assigned its resultant hash value. This hash value is compared against a memory-resident table. If the hash entry is found, the data is assumed to be redundant and replaced with a pointer to the existing block of data already stored in a disk storage system; the location of the existing data is given in the table. If the hash entry is not found, the data is stored in a disk storage system and its location recorded in the memory-resident table along with its hash. Some examples that illustrate this mechanism can be found in U.S. Pat. Nos. 7,065,619 assigned to Data Domain and 5,990,810 assigned to Quantum Corporation. Hash fingerprinting is typically executed in-line, that is, data is processed in real-time prior to being written to disk.

According to pattern recognition, the incoming data stream is first "chunked" or segmented into relatively large data blocks (on the order of about 32 MB). The data is then processed by a simple rolling hash method whereby a list of hash values is assembled. A transformation is made on the hash values where a resulting small list of values represents a data block "fingerprint." A search is then made on a table of hashes to look for at least a certain number of fingerprint hashes to be found in any other given stored block. If a minimum number of matches is not met, then the block is considered unique and stored directly to disk. The corresponding fingerprint hashes are added to a memory-resident table. Should the minimum number of matches be met, then there is a probability that the current data block matches a previously-stored data block. In this case, the block of disk storage associated with a matching fingerprint is read into memory and compared byte-for-byte against the candidate block that had been hashed. If the full sequence of data is equal, then the data block is replaced by a pointer to the physically addressed block of storage. If the full block does not match, then a mechanism that detects changed portions within the block is employed to determine a minimal data set within the block that needs be stored. The result is a combination of unique data plus references to a closely-matching block of previously-stored data. An example that illustrates this mechanism can be found in U.S. Patent Application US2006/0059207 assigned to Diligent Corporation. As with hash fingerprinting above, pattern recognition is typically executed in-line.

SUMMARY OF INVENTION

Aspects and examples disclosed herein present de-duplication techniques that are more efficient and scalable than conventional de-duplication techniques. Some examples manifest an appreciation that conventional hash fingerprinting techniques are constrained by the amount of available memory. Other examples reflect an understanding that random I/O workload is a substantial limitation under the pattern recognition approach. Thus, these examples manifest an appreciation of the limitations imposed by the conventional hash fingerprinting and pattern recognition de-duplication techniques.

For instance, some examples provide for a de-duplication system in which a data inspection process delineates data into regions by establishing a plurality of location identifiers within the data. According to these examples, the locations of the location identifiers are driven by the particular sequence of bit values present within the data itself. Further, in these examples, the de-duplication system determines which of these regions should be subject to further de-duplication processing by comparing metadata representing the targeted regions to metadata representing regions of a reference data set. In some examples, the metadata that is compared is a set of elements, wherein the elements themselves are sets of hash values. Further, according to these examples, the de-duplication system identifies an area of data that incorporates the regions that should be subject to further de-duplication processing and de-duplicates this area with reference to a corresponding area within the reference data set.

According to one example, a method of marking data for processing is provided. The method may by implemented by a computer system. The method includes acts of determining a rolling summary that identifies a particular pattern of stored data included in each respective region of a plurality of overlapping regions, comparing at least one proper subset of the rolling summary to a predetermined value and recording a location identifier that identifies a location within the data where the at least one proper subset equals the predetermined value. In the method, the act of determining the rolling summary may include an act of calculating a hash value from the stored data. In addition, the act of calculating the hash value may include an act of calculating a rolling XOR hash value.

The at least one proper subset of the rolling summary may be a proper subset of the bytes or bits that make up the rolling summary. Thus, the act of comparing the at least one proper subset may include an act of comparing the predetermined value to a value derived from 11 bits of the rolling XOR hash value. In addition, the method may include an act of comparing a subset of the rolling summary to a single predetermined value, i.e. without comparing the subset of the rolling summary to a plurality of predetermined values. Moreover, the act of recording the location identifier may include an act of recording a location of a boundary of a respective region of the plurality of overlapping regions.

The method may further include acts of determining a metric that indicates a frequency with which location identifiers are recorded for the data, comparing the metric to a predetermined threshold and adjusting, responsive to the metric transgressing the predetermined threshold, a characteristic of the at least one proper subset. In addition, the act of determining the metric may include an act of calculating a location identifier rate that equals the number of location identifiers recorded per an amount of the data. Further, the act of adjusting the characteristic of the at least one proper subset may include an act of adjusting the cardinality of the at least one proper subset.

According to another example, a system configured to mark data for processing is provided. The system includes data storage storing the data, the data including a plurality of overlapping regions and a processor coupled to the data storage. The processor is configured to determine a rolling summary of each respective region of the plurality of overlapping regions based on stored data included in each respective region, the rolling summary identifying a particular pattern of the stored data, compare at least one proper subset of the rolling summary to a predetermined value and record a location identifier that identifies a location within the data where the at least one proper subset equals the predetermined value. In the system, the processor may be configured to determine the rolling summary by calculating a hash value from the stored data. In addition, the processor may be configured to calculate a hash value by calculating a rolling XOR hash value. Further, the processor may be configured to compare the at least one proper subset by comparing the predetermined value to a value derived from 11 bits of the rolling XOR hash value. Moreover, the processor may be configured to record the location identifier by recording a location of a boundary of a respective region of the plurality of overlapping regions.

The processor may be further configured to determine a metric that indicates a frequency with which location identifiers are recorded for the data, compare the metric to a predetermined threshold and adjust, responsive to the metric transgressing the predetermined threshold, a characteristic of the at least one proper subset. In addition, the processor may be configured to determine the metric by calculating a location identifier rate that equals the number of location identifiers recorded per an amount of the data. Further, the processor may be configured to adjust the characteristic of the at least one proper subset by adjusting the cardinality of the at least one proper subset.

According to another example, a non-transitory computer readable medium is provided. The computer readable medium stores computer readable instructions that, when executed by at least one processor, instruct the at least one processor to perform a method of marking data for processing. This method includes acts of determining a rolling summary that identifies a particular pattern of stored data included in each respective region of a plurality of overlapping regions, comparing at least one proper subset of the rolling summary to a predetermined value and recording a location identifier that identifies a location within the data where the at least one proper subset equals the predetermined value. In addition, the instructions for determining the rolling summary may instruct the at least one processor to perform acts including calculating a rolling XOR hash value from the stored data. Further, the instructions for recording the location identifier may instruct the at least one processor to perform acts including recording a location of a boundary of a respective region of the plurality of overlapping regions. Moreover, the instructions may further instruct the at least one processor to perform acts including determining a metric that indicates a frequency with which location identifiers are recorded for the data, comparing the metric to a predetermined threshold and adjusting, responsive to the metric transgressing the predetermined threshold, a characteristic of the at least one proper subset.

According to another example, a method of characterizing data being associated with a plurality of location identifiers is provided. The method may by implemented by a computer system. As used in the method, each location identifier of the plurality of location identifiers identifies a location within the data where a particular pattern of data is stored. The method includes acts of identifying a first portion of the data based on a location of the first portion relative to a location identified by at least one of the plurality of location identifiers and determining a first plurality of summaries associated with the at least one of the plurality of location identifiers, at least one summary of the first plurality of summaries indicating a pattern of stored data included in the first portion.

In the method, the act of identifying the first portion may include an act of identifying a portion having a boundary sharing the location identified by the at least one of the plurality of location identifiers. In addition, the act of determining the first plurality of summaries includes calculating a hash value from the stored data. Further, the act of determining the first plurality of summaries may include an act of selecting at least one summary associated with another of the plurality of location identifiers. Moreover, the act of selecting the at least one summary may include an act of selecting at least one prior summary associated with a prior location identifier of the plurality of location identifiers, the prior location identifier identifying a location in the data prior to the location identified by the at least one of the plurality of location identifiers. Additionally, the act of determining the first plurality of summaries may includes acts of calculating a first hash value using a first hashing method and calculating a second hash value using a second hashing method.

The method may further include acts of storing the first plurality of summaries as a first member of a set of summaries, identifying a second portion of the data based on a location of the second portion relative to a location identified by at least one other of the plurality of location identifiers, determining a second plurality of summaries associated with the at least one other of the plurality of location identifiers, at least one summary of the second plurality of summaries indicating another pattern of stored data included in the second portion, storing the second plurality of summaries as a second member of the set of summaries and identifying a subset of the set of summaries based on values of summaries included in the set of summaries. In the method, the act of identifying the subset of the set of summaries may include an act of identifying at least one member of the set of summaries including a summary with a value that is higher than values of summaries included in other members of the set of summaries.

According to another example a system for characterizing data is provided. The system includes data storage storing the data and a plurality of location identifiers, each of the plurality of location identifiers identifying a location within the data where a particular pattern of data is stored and a processor coupled to the data storage. The processor is configured to identify a first portion of the data based on a location of the first portion relative to a location identified by at least one of the plurality of location identifiers and determine a first plurality of summaries associated with the at least one of the plurality of location identifiers, at least one summary of the first plurality of summaries indicating a pattern of stored data included in the first portion.

In the system, the processor may be configured to identify the first portion by identifying a portion having a boundary sharing the location identified by the at least one of the plurality of location identifiers. In addition, the processor may be configured to determine the first plurality of summaries by calculating a hash value from the stored data. Further, the processor may be configured to determine the first plurality of summaries by selecting at least one summary associated with another of the plurality of location identifiers. Moreover, the processor may be configured to select the at least one summary by selecting at least one prior summary associated with a prior location identifier of the plurality of location identifiers, the prior location identifier identifying a location in the data prior to the location identified by the at least one of the plurality of location identifiers. Additionally, the processor may be configured to determine the first plurality of summaries, by at least in part calculating a first hash value using a first hashing method and calculating a second hash value using a second hashing method.

The processor may be further configured to store the first plurality of summaries as a first member of a set of summaries, identify a second portion of the data based on a location of the second portion relative to a location identified by at least one other of the plurality of location identifiers, determine a second plurality of summaries associated with the at least one other of the plurality of location identifiers, at least one summary of the second plurality of summaries indicating a another pattern of stored data included in the second portion, store the second plurality of summaries as a second member of the set of summaries and identify a subset of the set of summaries based on values of summaries included in the set of summaries. In addition, the processor may be configured to identify the subset of the set of summaries by identifying at least one member of the set of summaries including a summary with a value that is higher than values of summaries included in other members of the set of summaries.

According to another example, a non-transitory computer readable medium is provided. The computer readable medium stores computer readable instructions that, when executed by at least one processor, instruct the at least one processor to perform a method of characterizing data. As used in the method, the data is associated with a plurality of location identifiers, each location identifier of the plurality of location identifiers identifying a location within the data where a particular pattern of data is stored. The method includes acts of identifying a first portion of the data based on a location of the first portion relative to a location identified by at least one of the plurality of location identifiers and determining a first plurality of summaries associated with the at least one of the plurality of location identifiers, at least one summary of the first plurality of summaries indicating a pattern of stored data included in the first portion. In addition, the instructions for determining the first plurality of summaries may instruct the at least one processor to perform acts including selecting at least one summary associated with another of the plurality of location identifiers. Further, the instructions may further instruct the at least one processor to perform acts including storing the first plurality of summaries as a first member of a set of summaries, identifying a second portion of the data based on a location of the second portion relative to a location identified by at least one other of the plurality of location identifiers, determining a second plurality of summaries associated with the at least one other of the plurality of location identifiers, at least one summary of the second plurality of summaries indicating another pattern of stored data included in the second portion, storing the second plurality of summaries as a second member of the set of summaries and identifying a subset of the set of summaries based on values of summaries included in the set of summaries. Moreover, the instructions for identifying the subset instruct the at least one processor to perform acts including identifying at least one member of the set of summaries including a summary with a value that is higher than values of summaries included in other members of the set of summaries.

According to another example, a method of identifying reference data likely to match target data is provided. The method may by implemented by a computer system. The method includes acts of reading a reference set of summaries of data included in a reference data set, each member of the reference set of summaries including a plurality of summaries that indicate particular patterns of the reference data within the reference data set, comparing the reference set of summaries to a target set of summaries associated with at least one target area of a plurality of target areas, each member of the target set of summaries including a plurality of summaries that indicate particular patterns of the target data included in the at least one target area, the plurality of target areas being included in a target data set and associating the at least one target area with the reference data set when a threshold number of members of the target set of summaries associated with the at least one target area match members of the reference set of summaries. In the method, the act of reading the reference set of summaries may include an act of reading a set of hash values.

As used in the method, the reference data set may include a plurality of reference areas and each reference area of the plurality of reference areas may be associated with at least one member of the reference set of summaries. The method may further include an act of selecting at least one reference area of the plurality of references areas based on a number of members of the target set of summaries associated with the at least one target area that match members of the reference set of summaries associated with the at least one reference area. In addition, the act of selecting the at least one reference area of the plurality of reference areas may include an act of selecting at least one reference area of the plurality of references areas based on a number of members of the target set of summaries associated with the at least one target area that match members of the reference set of summaries associated with at least one neighboring reference area of the plurality of reference areas that neighbors the at least one reference area.

The method may further include an act of adjusting the at least one reference area to include the at least one neighboring reference area when at least one member of the target set of summaries associated with the at least one target area matches at least one member of the reference set of summaries associated with the at least one neighboring reference area. In addition, the method may further include an act of adjusting the at least one target area to include at least one neighboring target area when at least one member of the reference set of summaries associated with the at least one reference area matches at least one member of the target set of summaries associated with the at least one neighboring target area. Further, the method may further include an act of de-duplicating the at least one target area with reference to the at least one reference area.

According to another example, a system for identifying reference data likely to match target data is provided. The system includes data storage storing a target data set and a processor coupled to the data storage. The processor is configured to and configured to read a reference set of summaries of data included in a reference data set, each member of the reference set of summaries including a plurality of summaries that indicate particular patterns of the reference data within the reference data set, compare the reference set of summaries to a target set of summaries associated with at least one target area of a plurality of target areas, each member of the target set of summaries including a plurality of summaries that indicate particular patterns of the target data included in the at least one target area, the plurality of target areas being included in the target data set and associate the at least one target area with the reference data set when a threshold number of members of the target set of summaries associated with the at least one target area match members of the reference set of summaries. In the system, the processor may be configured to read the reference set of summaries by reading a set of hash values.

In the system, the reference data set may include a plurality of reference areas and each reference area of the plurality of reference areas may be associated with at least one member of the reference set of summaries. The processor may be further configured to select at least one reference area of the plurality of references areas based on a number of members of the target set of summaries associated with the at least one target area that match members of the reference set of summaries associated with the at least one reference area. In addition, the processor may be configured to select the at least one reference area of the plurality of reference areas by selecting at least one reference area of the plurality of references areas based on a number of members of the target set of summaries associated with the at least one target area that match members of the reference set of summaries associated with at least one neighboring reference area of the plurality of reference areas that neighbors the at least one reference area.

The processor may be further configured to adjust the at least one reference area to include the at least one neighboring reference area when at least one member of the target set of summaries associated with the at least one target area matches at least one member of the reference set of summaries associated with the at least one neighboring reference area. In addition, the processor may be further configured to adjust the at least one target area to include at least one neighboring target area when at least one member of the reference set of summaries associated with the at least one reference area matches at least one member of the target set of summaries associated with the at least one neighboring target area. Further, the processor may be further configured to de-duplicate the at least one target area with reference to the at least one reference area.

According to another example, a non-transitory computer readable medium is provided. The computer readable medium stores computer readable instructions that, when executed by at least one processor, instruct the at least one processor to perform a method of identifying reference data likely to match target data. The method includes an act of reading a reference set of summaries of data included in a reference data set, each member of the reference set of summaries including a plurality of summaries that indicate particular patterns of the reference data within the reference data set. The method also includes an act of comparing the reference set of summaries to a target set of summaries associated with at least one target area of a plurality of target areas, each member of the target set of summaries including a plurality of summaries that indicate particular patterns of the target data included in the at least one target area, the plurality of target areas being included in a target data set. The method also includes an act of associating the at least one target area with the reference data set when a threshold number of members of the target set of summaries associated with the at least one target area match members of the reference set of summaries.

As used in the method, the reference data set includes a plurality of reference areas and each reference area of the plurality of reference areas is associated with at least one member of the reference set of summaries. The instructions may further instruct the processor to perform acts including selecting at least one reference area of the plurality of references areas based on a number of members of the target set of summaries associated with the at least one target area that match members of the reference set of summaries associated with the at least one reference area. In addition, the instructions for selecting the at least one reference area of the plurality of reference areas may instruct the processor to perform acts including selecting at least one reference area of the plurality of references areas based on a number of members of the target set of summaries associated with the at least one target area that match members of the reference set of summaries associated with at least one neighboring reference area of the plurality of reference areas that neighbors the at least one reference area. Further, the instructions may further instruct the processor to perform acts including adjusting the at least one reference area to include the at least one neighboring reference area when at least one member of the target set of summaries associated with the at least one target area matches at least one member of the reference set of summaries associated with the at least one neighboring reference area. Moreover, the instructions may further instruct the processor to perform acts including adjusting the at least one target area to include at least one neighboring target area when at least one member of the reference set of summaries associated with the at least one reference area matches at least one member of the target set of summaries associated with the at least one neighboring target area. Additionally, the instructions may further instruct the processor to perform acts including de-duplicating the at least one target area with reference to the at least one reference area.

According to another example, a method of locating redundancy within data is provided. The method may by implemented by a computer system. The method includes acts of recording target locations within target data where a summary that identifies a particular pattern within the target data equals a predetermined value, recording reference locations within reference data where a summary that identifies the particular pattern within the reference data equals the predetermined value, determining a reference set of summaries of the reference data, each member of the reference set of summaries including a plurality of summaries indicative of patterns of reference data located at recorded reference locations, determining a target set of summaries of the target data, each member of the target set of summaries including a plurality of summaries indicative of patterns of target data located at recorded target locations, identifying a subset of the reference data that is likely to match a subset of the target data by comparing members of the reference set of summaries to members of the target set of summaries.

In the method, the act of recording the target locations may include an act of recording target locations within the target data where a subset of a rolling hash value taken over a region of the target data equals the predetermined value. In addition, the act of determining the reference set of summaries may include an act of calculating a hash value over a portion of the reference data sharing a boundary with at least one recorded reference location. Further, the act of identifying the subset of the reference data may include an act of identifying an area of the target data associated with at least one member of the target set of summaries that matches at least one member of the reference set of summaries. Moreover, the act of identifying the subset of the reference data may include an act of identifying an area of the reference data associated the at least one member of the reference set of summaries.

The method may further include an act of adjusting the subset of the reference data after identifying a neighboring area of the reference data associated with at least one other member of the reference set of summaries that matches at least one member of the target set of summaries. In addition, the method may further include an act of de-duplicating the subset of the target data with reference to the subset of the reference data.

According to another example, a system for locating redundancy within data is provided. The system includes data storage storing reference data and target data and a processor coupled to the data storage. The processor is configured to record target locations within the target data where a summary that identifies a particular pattern within the target data equals a predetermined value, record reference locations within the reference data where a summary that identifies the particular pattern within the reference data equals the predetermined value, determine a reference set of summaries of the reference data, each member of the reference set of summaries including a plurality of summaries indicative of patterns of reference data located at recorded reference locations, determine a target set of summaries of the target data, each member of the target set of summaries including a plurality of summaries indicative of patterns of target data located at recorded target locations, identify a subset of the reference data that is likely to match a subset of the target data by comparing members of the reference set of summaries to members of the target set of summaries.

In the system, the processor may be configured to record the target locations by recording target locations within the target data where a subset of a rolling hash value taken over a region of the target data equals the predetermined value. In addition, the processor may be configured to determine the reference set of summaries by calculating a hash value over a portion of the reference data sharing a boundary with at least one recorded reference location. Further, the processor may be configured to identify the subset of the reference data by, at least in part, identifying an area of the target data associated with at least one member of the target set of summaries that matches at least one member of the reference set of summaries. Moreover, the processor may be configured to identifying the subset of the reference data includes identifying an area of the reference data associated the at least one member of the reference set of summaries.

The processor may be further configured to adjust the subset of the reference data after identifying a neighboring area of the reference data associated with at least one other member of the reference set of summaries that matches at least one member of the target set of summaries. In addition, the processor may be further configured to de-duplicate the subset of the target data with reference to the subset of the reference data.

According to another example, a non-transitory computer readable medium is provided. The computer readable medium stores computer readable instructions that, when executed by at least one processor, instruct the at least one processor to perform a method of locating redundancy within data. The method includes acts of recording target locations within target data where a summary that identifies a particular pattern within the target data equals a predetermined value, recording reference locations within reference data where a summary that identifies the particular pattern within the reference data equals the predetermined value, determining a reference set of summaries of the reference data, each member of the reference set of summaries including a plurality of summaries indicative of patterns of reference data located at recorded reference locations, determining a target set of summaries of the target data, each member of the target set of summaries including a plurality of summaries indicative of patterns of target data located at recorded target locations and identifying a subset of the reference data that is likely to match a subset of the target data by comparing members of the reference set of summaries to members of the target set of summaries. In addition, the instructions for recording the target locations may instruct the processor to perform acts including recording target locations within the target data where a subset of a rolling hash value taken over a region of the target data equals the predetermined value. Further, the instructions for determining the reference set of summaries may instruct the processor to perform acts including calculating a hash value over a portion of the reference data sharing a boundary with at least one recorded reference location. Moreover, the instructions for identifying the subset of the reference data may instruct the processor to perform acts including identifying an area of the target data associated with at least one member of the target set of summaries that matches at least one member of the reference set of summaries. Additionally, the instructions for identifying the subset of the reference data may instruct the processor to perform acts including identifying an area of the reference data associated the at least one member of the reference set of summaries. Furthermore, the instructions may further instruct the processor to perform acts including adjusting the subset of the reference data after identifying a neighboring area of the reference data associated with at least one other member of the reference set of summaries that matches at least one member of the target set of summaries.

Still other aspects, examples, and advantages of these exemplary aspects and examples, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of the invention. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
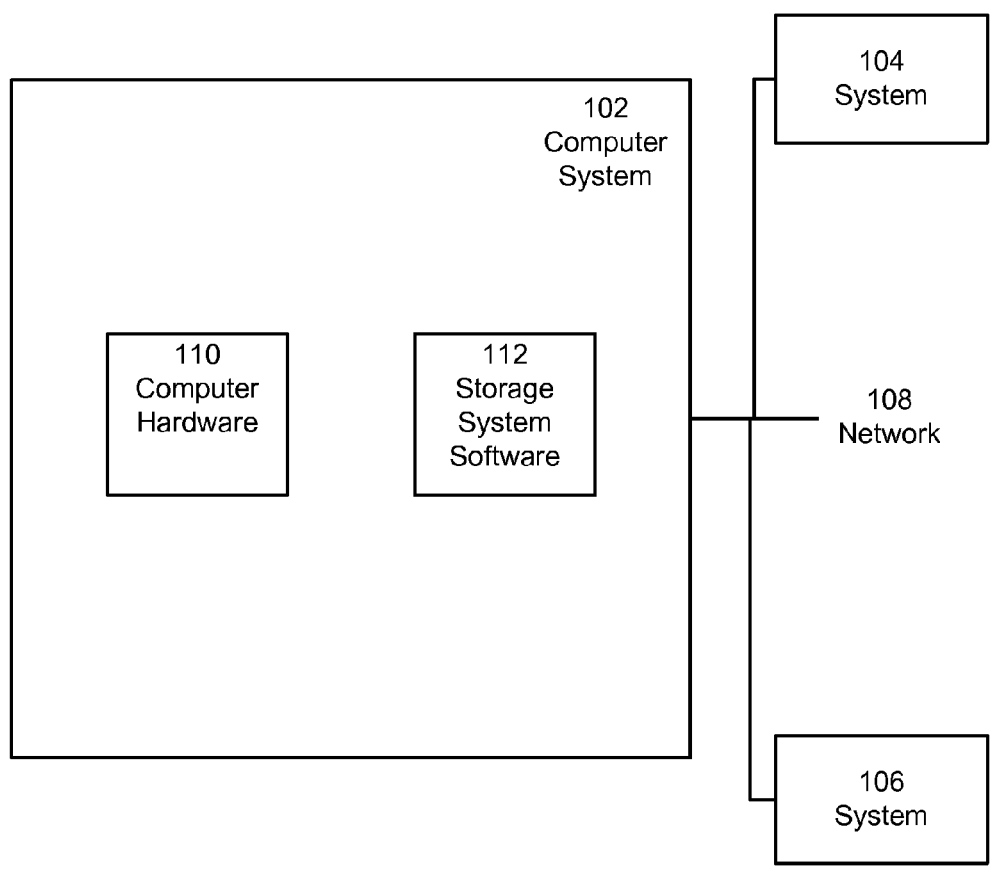
FIG. 1 is a block diagram of one example of a networked computing environment that includes a back-up storage system.

Aspects and examples relate to apparatus and processes for selectively de-duplicating data based on underlying characteristics of the data, such as the particular sequence of bit values present within the data. For instance, methods and apparatus in accord with some examples establish location identifiers (referred to as "ticks") within regions (referred to as "windows") of data targeted for de-duplication and within corresponding reference data. Further, according to these examples, location identifiers indicate locations where summaries that characterize the contents of the regions are created. The summaries are then used to determine which regions of the targeted data are likely to include data redundant with regions of the reference data. In some examples, the summaries are sets with elements that are themselves sets of hash values. Additionally, in these examples, an area of the targeted data (referred to as a "swath") is identified and de-duplicated with reference to a corresponding swath of reference data. In at least one example, the swath includes not only the regions of the data that have been determined to be most likely to include redundant data but also additional data, as is discussed further below.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Furthermore, the data manipulated by examples disclosed herein may be organized into various data objects on one or more computer systems. These data objects may include any structure in which data may be stored. A non-limiting list of exemplary data objects includes bits, bytes, data files, data blocks, data directories and back-up data sets.

Data Driven De-Duplication

Various examples disclosed herein effect data driven de-duplication of data stored on one or more computer systems. As is explained further below, data driven de-duplication processes harness underlying characteristics of the data to identify and remove redundant data more efficiently than conventional de-duplication processes. More specifically, data driven de-duplication processes inspect the structure and the content of data and tailor actions taken based on the particular nature of the data targeted for de-duplication. FIG. 1 illustrates a computer system 102 that is specially configured to perform a data driven de-duplication process according to the aspects and functions disclosed herein. As shown, the computer system 102 is coupled to, and can exchange data with, systems 104 and 106 via network 108. In addition, according to this example, the computer system 102 includes computer hardware 110 and storage system software 112. In at least one example, the computer hardware 110 shown in FIG. 1 includes a processor and a memory coupled to the processor. In one example, the memory includes volatile memory, such as RAM, and non-volatile memory, such as a magnetic disk. Other examples of the computer hardware 110 include a variety of components which are discussed further below with regard to FIGS. 3 and 4.

Figure 2:
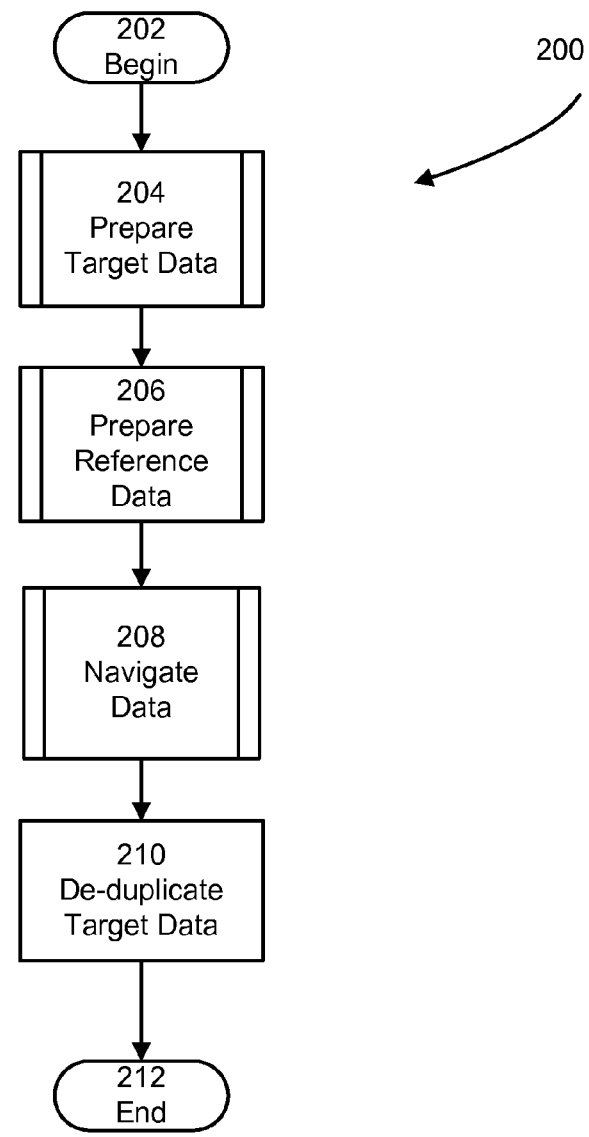
FIG. 2 is a flow diagram of a method for de-duplicating data objects.

In the example illustrated in FIG. 1, the storage system software 112 includes elements, e.g. executable code and data structures, configured to cause the computer system 102 to perform a data driven de-duplication process. As will be explained in detail below, the storage system software 112 includes navigation software that has the ability to find regions of data with similarity based on sets of hash values taken at locations driven by data. A particular example of the elements included in the storage system software 112 is discussed further below with regard to FIG. 5. An example of a data driven de-duplication process as defined by the storage system software 112 is illustrated as process 200 in FIG. 2. In this example, the process 200 includes acts of preparing data targeted for de-duplication, preparing data to be referenced during the de-duplication of the target data, navigating the reference data and de-duplicating the target data. Process 200 begins at 202.

In act 204, target data is prepared for de-duplication. According to various examples, a computer system prepares the target data by locating location identifiers within the target data and generating fingerprints of data located near the location identifiers. Acts in accord with these examples are discussed below with reference to FIG. 12.

In act 206, reference data is prepared for de-duplication. According to various examples, a computer system prepares the reference data by locating location identifiers within the reference data and generating fingerprints of data located near the location identifiers. Acts in accord with these examples are discussed below with reference to FIG. 13.

In act 208, target data and reference data is navigated to place swaths at locations matching a set of predefined criteria. According to several examples, a computer system positions the swaths relative to one or more regions of data in the target and the reference that have matching fingerprints. Acts in accord with these examples are discussed below with reference to FIG. 14.

In act 210, the target data is de-duplicated. According to a variety of examples, a network of computer systems performs a byte-by-byte comparison between the data in the target swath and the data in the reference swath. When a predetermined quantity of redundant data is found, the computer system replaces the redundant data included in target swath with a pointer to the matching data in the reference swath. In other examples, the network of computer systems calculates a hash value for the data in the target swath and the data in the reference swath using a hash function with strong collision resistance. In these examples, the network of computer systems ensures a high probability that both sets of data are identical prior to replacing the redundant data in the target swath with a pointer to the matching data in the reference swath. Further examples use various data de-duplication techniques known in the art and examples are not limited to a particular de-duplication technique or set of techniques.

Process 200 ends at 212. Data de-duplication activities in accord with process 200 make efficient use of data storage media by decreasing the amount of data that must be physically stored. In addition, data de-duplication activities in accord with process 200 efficiently de-duplicate data is that randomly distributed within target and reference data sets.

Computer System

As discussed above, aspects and functions disclosed herein may be implemented as hardware or software on one or more of these computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects may be implemented in software, hardware or firmware, or any combination thereof. Thus, aspects may be implemented within methods, acts, systems, system elements and components using a variety of hardware and software configurations, and examples are not limited to any particular distributed architecture, network, or communication protocol.

Figure 3:
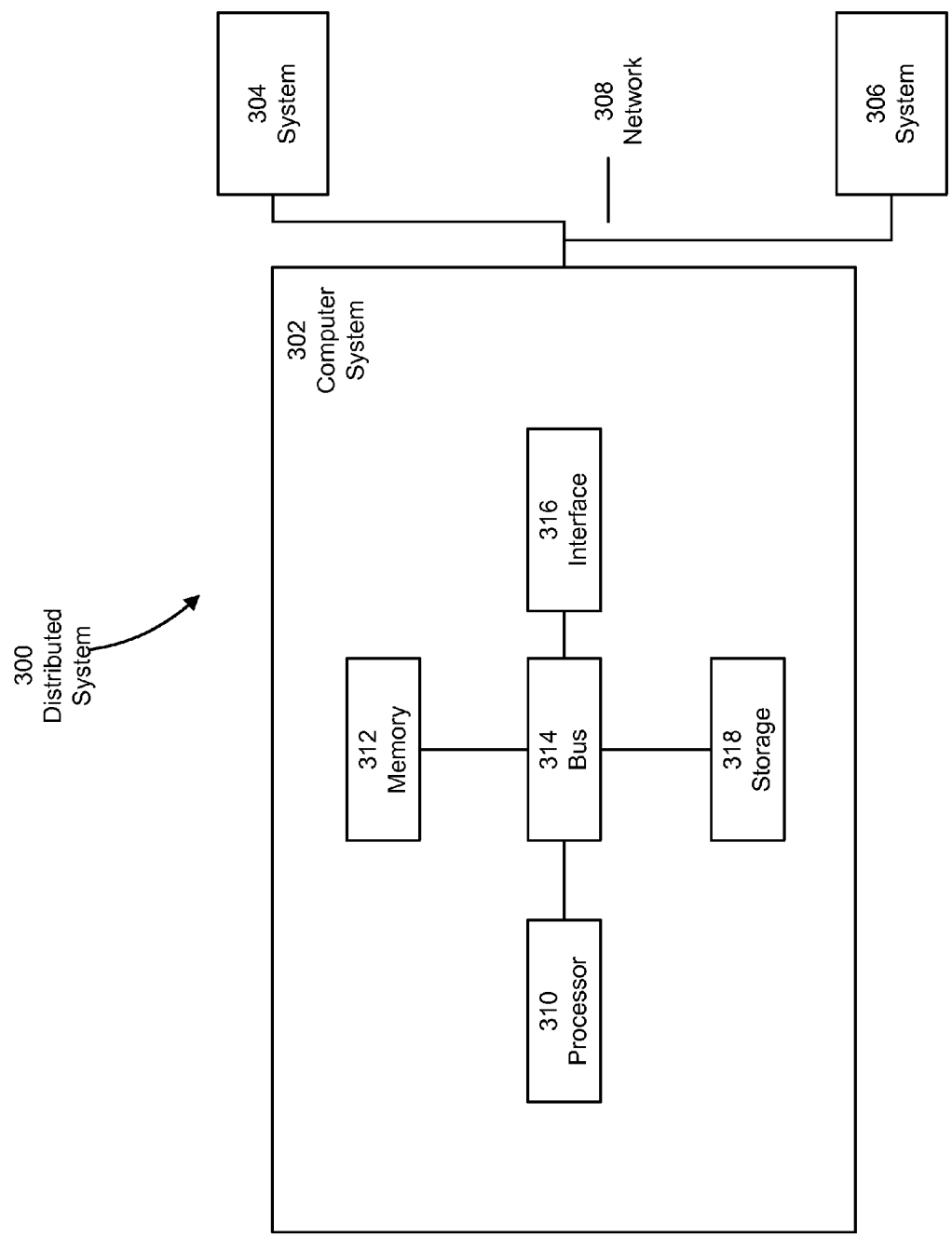
FIG. 3 is a block diagram of one example of a computer system that may be used to perform processes disclosed herein.

Referring to FIG. 3, there is illustrated a block diagram of a distributed computer system 300, in which various aspects and functions may be practiced. The distributed computer system 300 may include one more computer systems that exchange (i.e. send or receive) information. For example, as illustrated, the distributed computer system 300 includes computer systems 302, 304 and 306. As shown, the computer systems 302, 304 and 306 are interconnected by, and may exchange data through, communication a network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TSL, SSL or VPN. While the distributed computer system 300 illustrates three networked computer systems, the distributed computer system 300 is not so limited and may include any number of computer systems and computing devices, networked using any medium and communication protocol.

As discussed above with regard to FIG. 1, various aspects and functions may be implemented as specialized hardware or software executing in one or more computer systems. FIG. 3 illustrates a particular example of the elements that may be included in the computer hardware 110 shown in FIG. 1. As illustrated in FIG. 3, the computer system 302 includes a processor 310, a memory 312, a bus 314, an interface 316 and data storage 318. The processor 310 may perform a series of instructions that result in manipulated data. The processor 310 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 310 is connected to other system elements, including one or more memory devices 312, by the bus 314.

The memory 312 may be used for storing programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein.

Components of the computer system 302 may be coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. Thus, the bus 314 enables communications, for example, data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and communicate with external entities, such as users and other systems.

The data storage 318 may include a computer readable and writeable nonvolatile (non-transitory) data storage medium in which instructions are stored that define a program that may be executed by the processor 310. The data storage 318 also may include information that is recorded, on or in, the medium, and this information may be processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller may cause data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 may manipulate the data within the memory 312, and then copy the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as for example, an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. Usually, a processor or controller, such as the processor 310, executes an operating system which may be, for example, a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular implementation.

The processor 310 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform described functions.

Storage System

Figure 4:
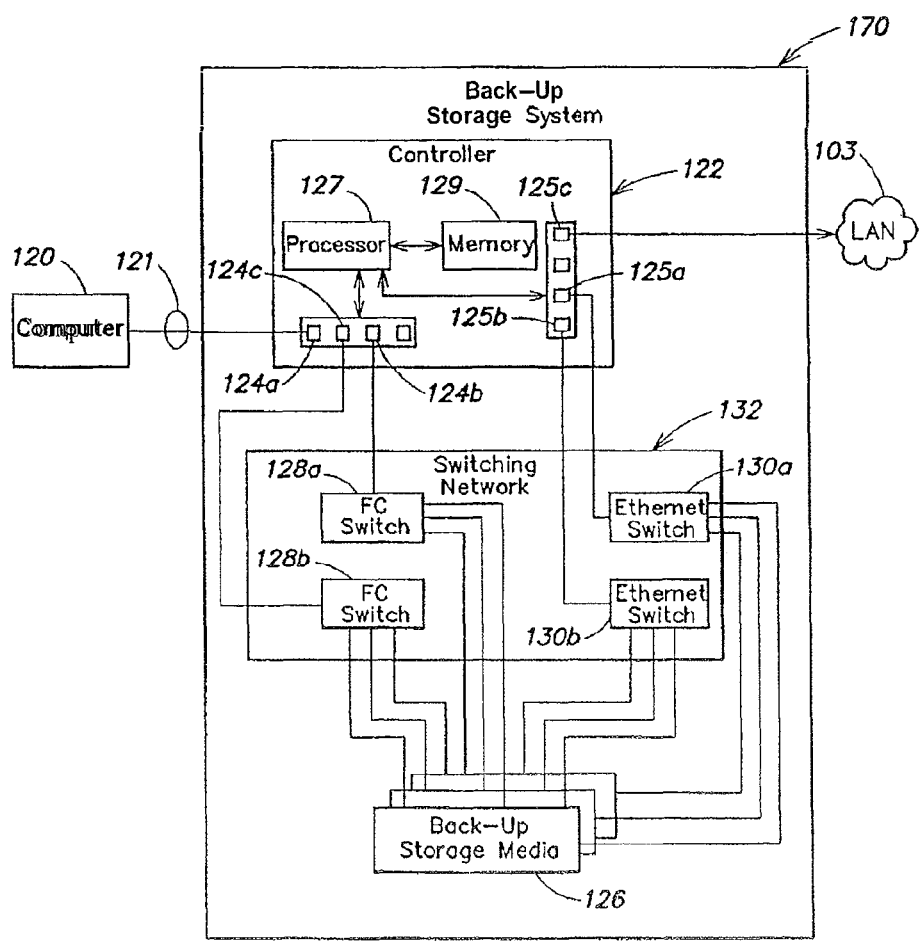
FIG. 4 is a block diagram of one example of a storage system configured to perform processes disclosed herein.

Some examples are directed toward a computer system specially configured as a data back-up storage system. FIG. 4 illustrates, in block diagram form, one example of a storage system 170. In this example, the hardware of the storage system 170 includes a storage system controller 122 and a switching network 132 that connects the storage system controller 122 to a back-up storage media 126. The storage system controller 122 includes a processor 127 (which may be a single processor or multiple processors) and a memory 129. The memory 129 may include volatile (such as RAM) and nonvolatile portions (such as ROM, PROM, EEPROM, Flash memory, magnetic disk, optical disk, etc. or combinations thereof) that may run all or some of the storage system software, as discussed further below. The memory 129 may also be used to store metadata relating to the data stored on the back-up storage media 126. Software, including programming code that implements functions disclosed herein, is generally stored on a computer readable and/or writeable nonvolatile recording medium, such as ROM, optical or magnetic disk or tape, etc., and then copied into memory 129 wherein it may then be executed by the processor 127. As discussed above with regard to FIG. 3, such programming code may be written in any of a plurality of programming languages, for example, Assembler, Java, Visual Basic, C, C#, or C++, Fortran, Pascal, Eiffel, Basic, COBOL, or combinations thereof, as the present invention is not limited to a particular programming language. Typically, in operation, the processor 127 causes the programming code to be read from a nonvolatile recording medium into another form of memory, such as RAM, that allows for faster access to the information by the processor than does the nonvolatile recording medium.

As shown in FIG. 4, the controller 122 also includes a number of port adapters that couple the controller 122 to the computer system 120 and to the switching network 132. As illustrated, the computer system 120 is coupled to the storage system via a port adapter 124*a*, which may be, for example, a Fibre Channel port adapter. Via the storage system controller 122, the computer system 120 backs up data onto the back-up storage media 126 and can recover data from the back-up storage media 126.

In the illustrated example, the switching network 132 may include one or more Fibre Channel switches 128*a*, 128*b*. The storage system controller 122 includes a plurality of Fibre Channel port adapters 124*b* and 124*c* to couple the storage system controller to the Fibre Channel switches 128*a*, 128*b*. Via the Fibre Channel switches 128*a*, 128*b*, the storage system controller 122 allows data to be backed-up onto the back-up storage media 126. As illustrated in FIG. 4, the switching network 132 may further include one or more Ethernet switches 130*a*, 130*b* that are coupled to the storage system controller 122 via Ethernet port adapters 125*a*, 125*b*. In one example, the storage system controller 122 further includes another Ethernet port adapter 125*c* that may be coupled to, for example, a LAN 103 to enable the storage system 170 to communicate with other computer systems.

In the example illustrated in FIG. 4, the storage system controller 122 is coupled to the back-up storage media 126 via a switching network that includes two Fibre Channel switches and two Ethernet switches. Provision of at least two of each type of switch within the storage system 170 eliminates any single points of failure in the system. In other words, even if one switch (for example, Fibre Channel switch 128*a*) were to fail, the storage system controller 122 would still be able to communicate with the back-up storage media 126 via another switch. Such an arrangement may be advantageous in terms of reliability and speed. For example, as discussed above, reliability is improved through provision of redundant components and elimination of single points of failure. In addition, in some examples, the storage system controller 122 is able to back-up data onto the back-up storage media 126 using some or all of the Fibre Channel switches in parallel, thereby increasing the overall back-up speed. However, there is no requirement that the system comprise two or more of each type of switch, nor that the switching network comprise both Fibre Channel and Ethernet switches. Furthermore, in examples wherein the back-up storage media 126 comprises a single disk array, no switches at all may be necessary.

In one example, the back-up storage media 126 may include one or more disk arrays. In another example, the back-up storage media 126 include a plurality of ATA or SATA disks. Such disks are "off the shelf" products and may be relatively inexpensive compared to conventional storage array products from manufacturers such as EMC, IBM, etc. In accordance with one example, back-up storage media may be organized to implement any one of a number of RAID (Redundant Array of Independent Disks) schemes. For example, in one example, the back-up storage media may implement a RAID-5 implementation.

Although software may be described as being "included" in the storage system 170, and may be executed by the processor 127 of the storage system controller 122 (see FIG. 4), there is no requirement that all the software be executed on the storage system controller 122. Thus, there is no requirement that the storage system controller 122 be a contained physical entity such as a computer system. The storage system 170 may communicate with software that is resident on a computer system such as, for example, the media server(s) 114 or application servers 102. In addition, the storage system 170 may contain several software applications that may be run or resident on the same or different computer systems. Moreover, the storage system 170 is not limited to a discrete piece of equipment, although in some examples, the storage system 170 may be embodied as a discrete piece of equipment.

In one example, the storage system 170 is provided as a self-contained unit that acts as a "plug and play" (i.e., no modification need be made to existing back-up procedures and policies) replacement for conventional back-up systems. Such a storage system unit may also be used in a networked computing environment that includes a conventional back-up system to provide redundancy or additional storage capacity. In another example, the storage system 170 may be implemented in a distributed computing environment, such as a clustered or a grid environment.

Example System Architecture

Figure 5:
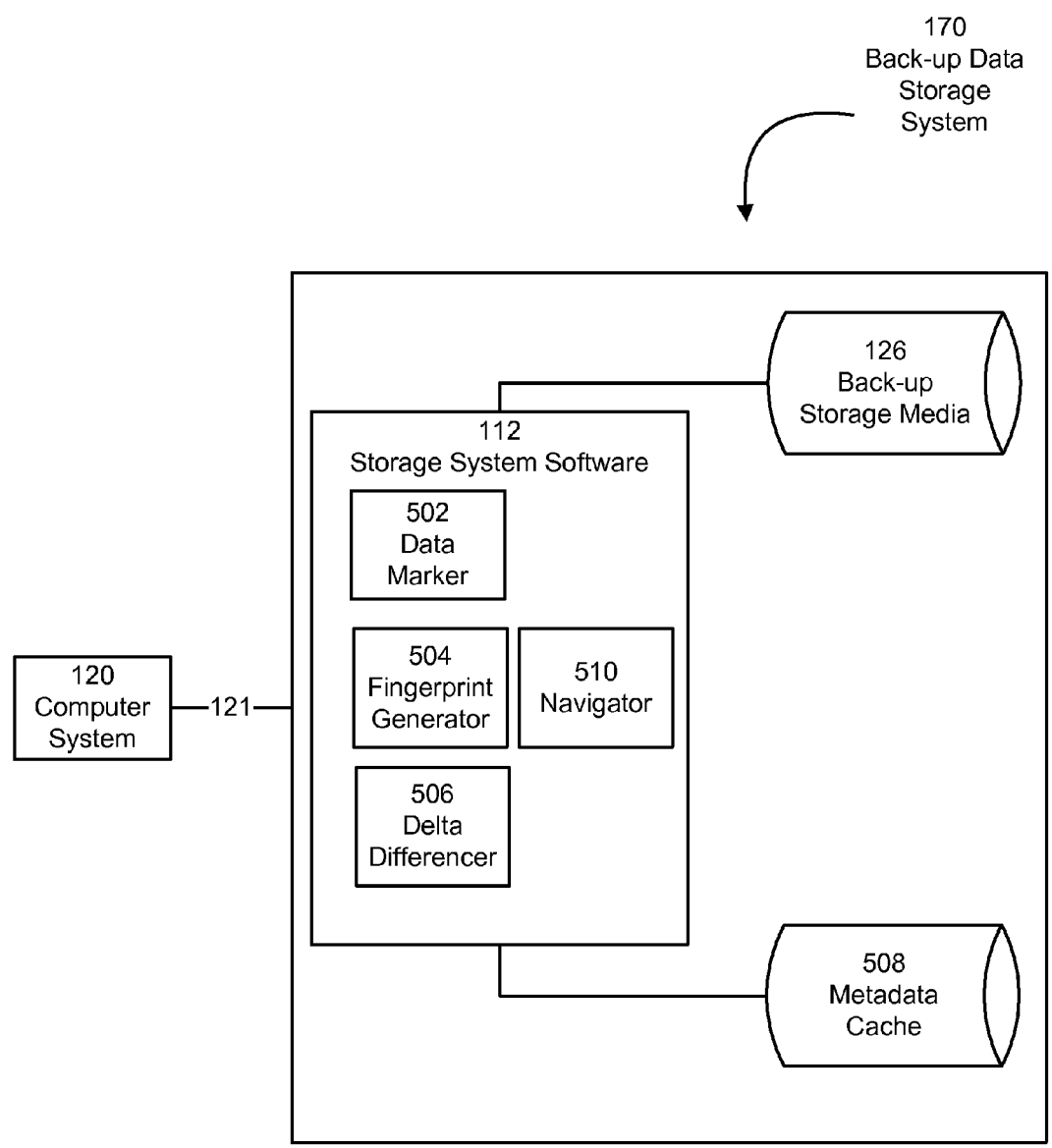
FIG. 5 is a block diagram illustrating a storage system in the context of a networked computing environment and configured to perform processes disclosed herein.

FIG. 5 presents, in block diagram form, physical and logical elements of a back-up storage system 170 in the context of a networked computing environment. The back-up storage system 170 includes hardware, as discussed above with reference to FIG. 3, and storage system software 112, as discussed above with regard to FIG. 1, that together interface with a computer system 120 (running the back-up/restore application). As shown, the storage system software 112 includes a data marker 502, a fingerprint generator 504, a delta differencer 506 and a navigator 510, which are discussed further below.

In this example, the back-up storage system 170 also includes a "logical metadata cache" 508 that stores metadata relating to data that is backed-up from the computer system 120 onto the storage system 170. As used herein, the term "metadata" refers to data that represents information about data and describes attributes of actual data. A non-limiting, exemplary list of metadata may include hash values, location identifiers, data size, logical and/or physical location of the data in primary storage, one or more hash values representing the data, the creation date of the data, the date of the last modification of the data, the back-up policy name under which the data was stored, an identifier, e.g. a name or watermark, of the data and the data type of the data, e.g. a software application associated with the data. In various examples, the storage system software 112 uses the data stored in the logical metadata cache 508 in a variety of ways, as is discussed more fully below.

The back-up storage system 170 is one example of a system that is specially configured to perform the functions disclosed herein. However, the system structure and content recited with regard to FIG. 5 are for exemplary purposes only and are not intended to limit other examples to the specific structure shown in FIG. 5. As will be apparent to one of ordinary skill in the art, many variant system structures, such as the structure shown in FIG. 3, can be architected without deviating from the substance of the examples disclosed herein.

In addition, information may flow between the elements, components and subsystems described herein using any technique. Such techniques include, for example, passing the information over the network using standard protocols, such as TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the invention.

Also, in the illustrated example, a computer system 120 is coupled to the storage system 170 via a network 121. The network 121 may include one or more networks that support a variety of communication protocols. For example, the network 121 may be a public network, such as the internet, and may include other public or private networks such as LANs, WANs, extranets and intranets. According to one example, the network 121 is a Fibre Channel network that allows high-speed transfer of data between the computer system 120 and the storage system 170. The computer system 120 may enable back-up of data from any of the computers present in the networked computing environment or from a primary storage device, such as network accessible data storage. As discussed above, the storage system 170 includes back-up storage media 126 that may be, for example, one or more disk arrays. The back-up storage media 126 provide the actual storage space for back-up data from the computer system 120.

Figure 6:
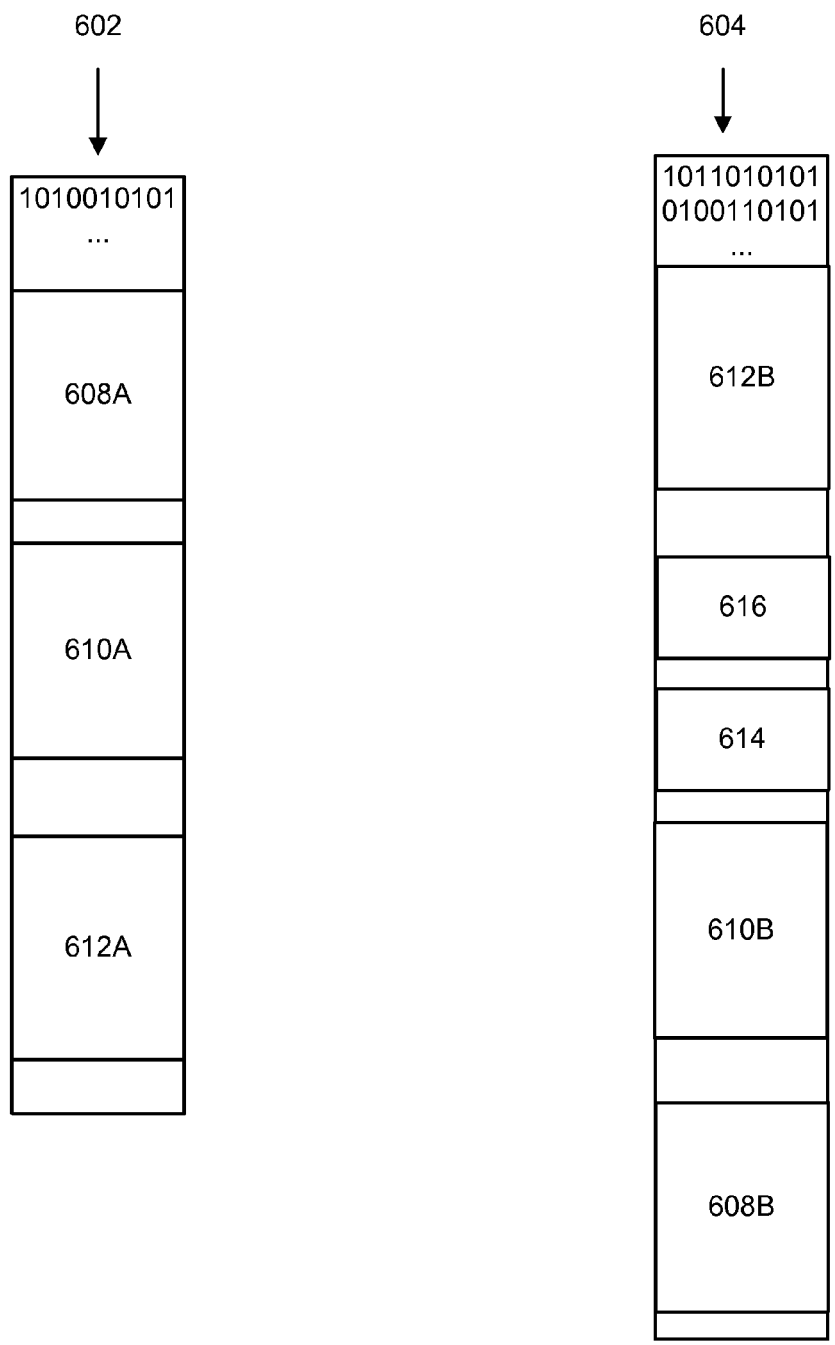
FIG. 6 is a schematic layout of one example of two data sets used in de-duplication processing.

According to a variety of examples, data may be stored on the back-up storage media 126 in discrete data sets that correspond to back-ups taken at different times or using different methodologies (for example, full or incremental back-ups). FIG. 6 illustrates an example data structure in which back-up data may be stored on the back-up storage media 126. FIG. 6 includes data sets 602 and 604. In this example, the data sets 602 and 604 include data stored by different back-up processes. In other examples, the data sets 602 and 604 may be created by any computerized process and examples disclosed herein are not limited to data created and stored by any particular process.

In some examples in accord with FIG. 5, the back-up storage system 170 performs a de-duplication process on data that is stored on the back-up storage media 126, such as the data sets 602 and 604 illustrated in FIG. 6. According to these examples, data de-duplication may be performed in-line, i.e. while the storage system 170 is receiving data to be de-duplicated and stored. In other examples, data de-duplication may be performed off-line, i.e. after the storage system 170 has already stored the data to be de-duplicated. As illustrated in FIG. 6, the data set 602 is targeted for de-duplication and includes target regions 608A, 610A and 612A. These target regions may be, for example, partial or incremental backups of one or more primary systems. Also, according to this example, data set 604 is designated for use as a reference data set during the de-duplication of data set 602. As illustrated, the data set 604 includes data reference regions 608B, 610B, 612B, 614 and 616. These reference regions may be, for example, baseline or full backups of one or more primary systems. Further, in this example, the target region 608A contains the same data as reference region 608B, target region 610A contains the same data as reference region 610B and target region 612A contains the same data as reference region 612B. While the bulk of this disclosure assumes that the data sets 602 and 604 include multiple target regions and reference regions, other examples can work with data sets which include only one target region and one reference region. Thus, examples are not limited to a particular number of data sets, target regions or reference regions.

Figure 7:
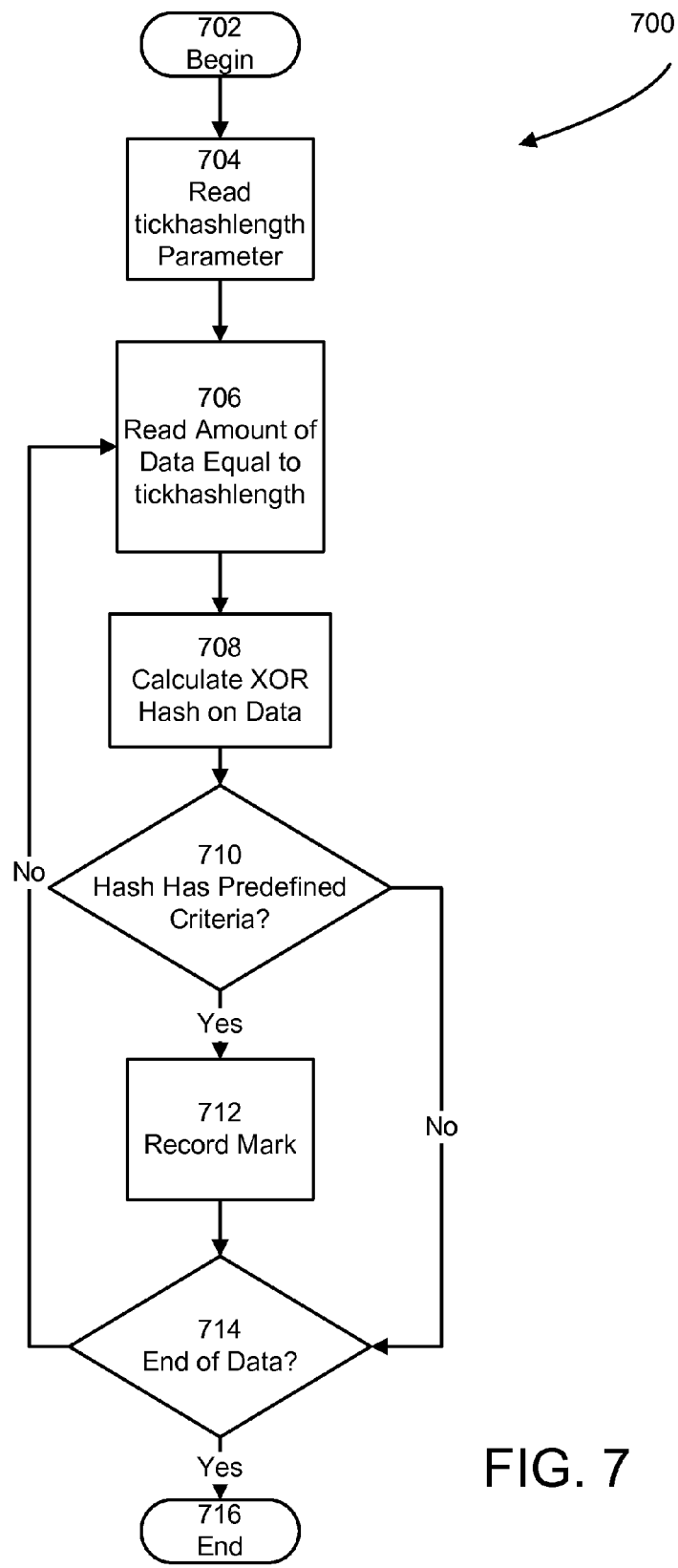
FIG. 7 is a flow diagram of a method for marking data for subsequent de-duplication processing.

As discussed above in the example shown in FIG. 5, the storage system software 112 includes the data marker 502, the fingerprint generator 504, the delta differencer 506 and the navigator 510. The process that the data marker 502 configures the storage system 170 to execute is illustrated in FIG. 7, which is discussed further below. As shown, the data marker 502 includes elements configured to determine location identifiers within the data to serve as markers used during subsequent de-duplication processing. In some examples, the data marker 502 is configured to mark, e.g. record, a location identifier when the data at or near the location possesses some predetermined characteristic. Thus, in these examples, the data marker 502 is determinative in that it will consistently produce location identifiers at the same locations within a given set of data.

In at least one example, the data marker 502 implements a rolling XOR hash to produce location identifiers. In this example, the data marker 502 is configured to read a parameter (referred to as the "tickhashlength" parameter) that specifies an amount of data (for example, a number of bytes) over which to calculate the XOR hash. In one example, the tickhashlength is specified as a number of sequential bytes. Further, according to this example, the data marker 502 is configured to read through the data, calculating the rolling XOR hash for each sequential region of data having a size of tickhashlength. Thus, in this example, the data marker 502 calculates the rolling XOR hash through a window of data that has a size of tickhashlength and that increments through the data byte by byte. According to this example, the data marker 502 is configured to record a location identifier when the lower 11 bits of the XOR hash have a value of 1. Thus, given a set of randomly distributed data, this particular example of the data marker 502 should, on average, generate a location identifier once every 2048 bytes. In various examples, the data marker 502 is configured to provide the location of the location identifier (for example, an offset into a particular set of data) to the fingerprint generator 504 which is discussed further below.

In other examples, the data marker 502 is configured to monitor a tick rate (i.e. the number of location identifiers found per the amount of data inspected) or another metric that indicates the frequency with which location identifiers are found. In these examples, when the tick rate transgresses a predetermined threshold value, the data marker 502 adjusts the predetermined characteristics or other criteria required to produce a location identifier in a manner suitable to change the tick rate. For instance, in one example, if the tick rate falls below 1 location identifier per every 8192 bytes reviewed, the data marker 502 is configured to alter its behavior to record a location identifier when the lower 10 bits (rather than the lower 11 bits) of the XOR hash have a value of 1, thereby doubling the probability of finding a location identifier in future processing.

Other examples adjust the criteria for finding a location identifier differently and examples are not limited to a particular set of criteria, threshold values or manner of criteria adjustment. For instance, in one example, the data marker 502 is configured to decrease the probability of finding a location identifier if the tick rate crosses another threshold value. In this example, the data marker 502 is configured to increase the number of bits evaluated to generate a location identifier, for example, to the lower 12 bits of the XOR hash value.

Figure 8:
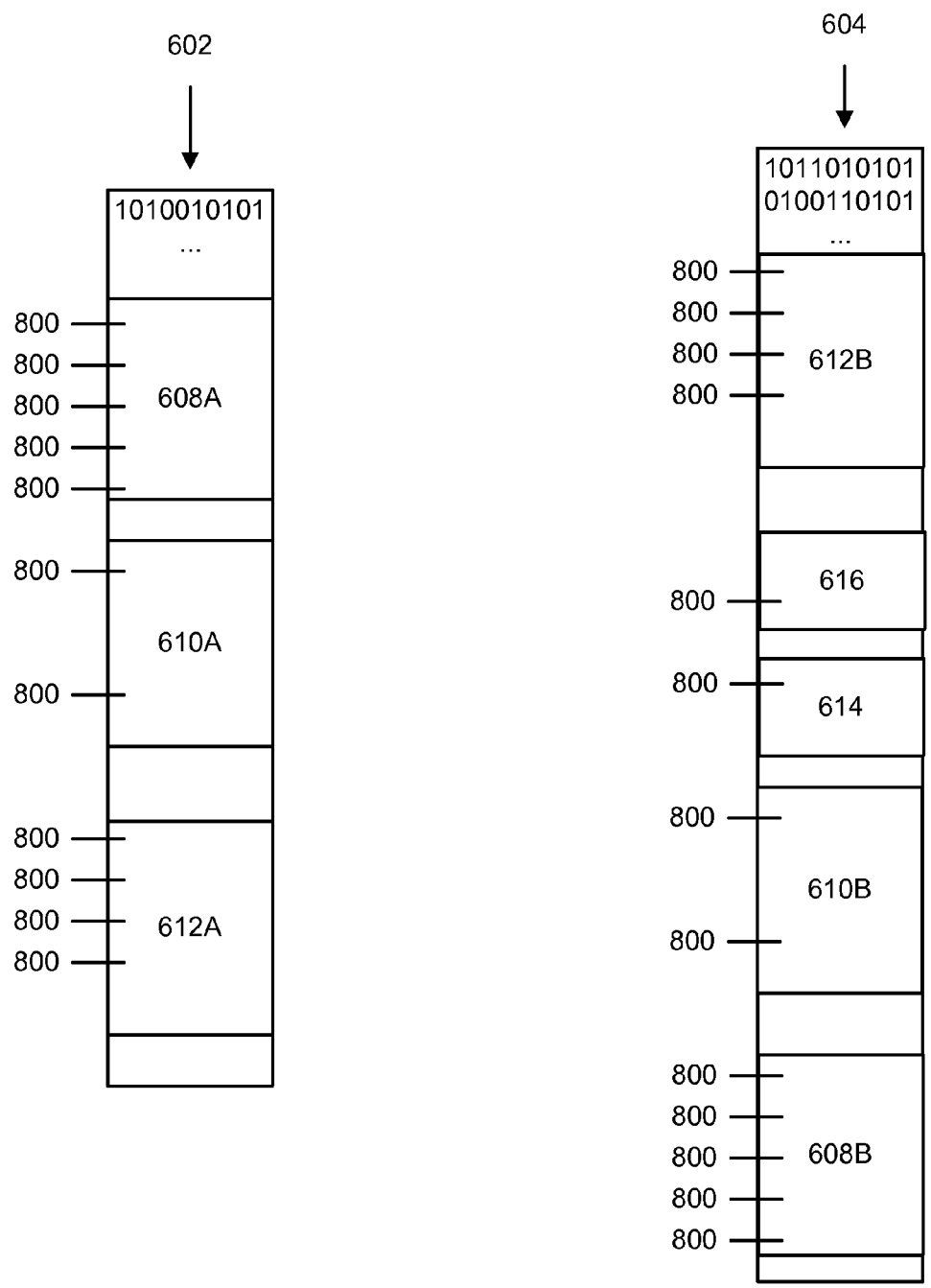
FIG. 8 is a schematic layout of another example of two data sets used in de-duplication processing.

FIG. 8 illustrates the data sets 602 and 604 after the process defined by the data marker 502 has been executed on both data sets. As illustrated, the data marker 502 has located several location identifiers 800 within the target windows and reference portions shown. In addition, as illustrated, the target windows 608A, 610A and 612A have the same number of location identifiers located at the same positions as the reference regions 608B, 610B and 612B, respectively. This demonstrates the data driven determinative nature of the data marker 502.

Figure 9:
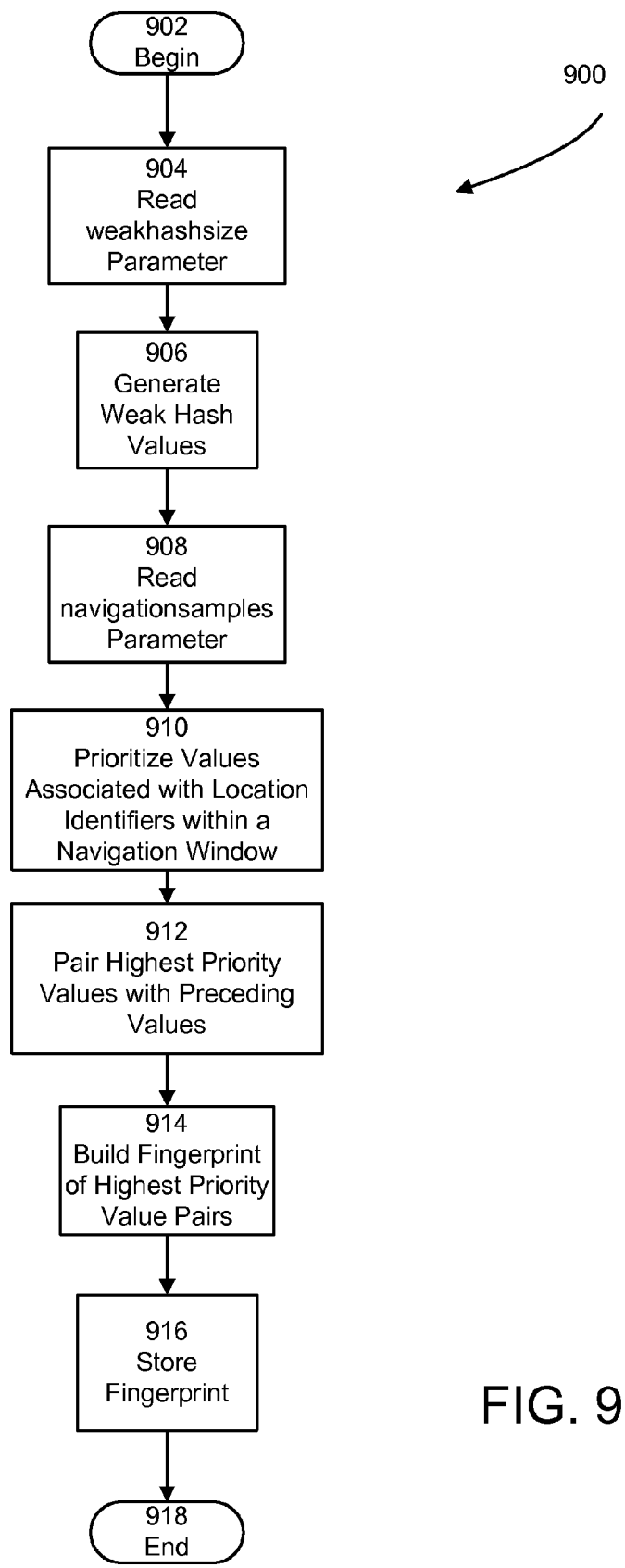
FIG. 9 is a flow diagram of a method for fingerprinting data.

According to a variety of examples, the fingerprint generator 504 includes elements configured to generate summaries (for example, fingerprints) for portions of data (referred to as navigation windows) that include a multiple number of location identifiers. As will be discussed below, the fingerprints are used to determine if a set of data might include data that is redundant with another set of data. In some examples, the fingerprint generator 504 is configured to store weak hash value pairs that are associated with location identifiers falling with a particular navigation window. These weak hash value pairs may have been generated by a weak hash function, i.e. a computationally efficient hash function. In these examples, the fingerprint generator 504 is configured to select and store the weak hash value pairs that match a set of predefined criteria. The process that the fingerprint generator 504 configures the storage system 170 to execute is illustrated in FIG. 9 which is discussed further below.

In some examples, the fingerprint generator 504 is configured to characterize the portions of data disposed after the location identifiers. As is discussed further below, in some examples, these characterizations are used to build aggregate summaries that characterize navigation windows within target data and reference data. In at least one example, the characterization takes the form of a weak hash value. In this example, the fingerprint generator 504 is configured to read a parameter (referred to as a "weakhashsize") that specifies an amount of data over which to calculate the weak hash value. Moreover, according to this example, the fingerprint generator 504 is configured to generate a weak hash value using an amount of data located after each location identifier having a size equal to the weakhashsize parameter. In this example, the fingerprint generator 504 is further configured to pair this weak hash value with a weak hash value associated with the previous location identifier (if such exists) and associate this weak hash value pair with the navigation window.

Continuing with this example, the fingerprint generator 504 is configured to store, for each navigation window, a set of weak hash value pairs in a fingerprint. In various examples, the fingerprint generator 504 may be configured to prioritize weak hash value pairs for inclusion and storage in fingerprints based on a variety of attributes. For instance, in some of these examples, the fingerprint generator 504 may be configured to prioritize weak hash value pairs based on the values included within each pair. Thus, in these examples, the fingerprint generator 504 may prioritize weak hash value pairs that include the highest weak hash values, the lowest weak hash values or the weak hash values that are the closest in value, among other prioritization schemes.

In another example, the fingerprint generator 504 is configured to read a parameter (referred to as a "navigationsamples" parameter) that specifies the maximum number of elements of the set of weak hash value pairs to include in the fingerprint for a navigation window. According to this example, the fingerprint generator 504 is configured to scan weak hash value pairs associated with each navigation window. Additionally, in this example, the fingerprint generator 504 is configured to build, for each navigation window, a set of weak hash value pairs based on a particular prioritization scheme (for example, those pairs that include the highest weak hash values compared to other weak hash values associated the navigation window). Further, according to this example, the fingerprint generator 504 is configured to restrict the number of elements of the fingerprint set to be no more than the number specified by the navigationsamples parameter. Moreover, in this example, the fingerprint generator 504 is configured to record, within the logical metadata cache 508, the resulting set of weak hash value pairs as the fingerprint associated with each examined portion.

As discussed above, in this example, the fingerprint generator 504 creates fingerprints that are sets with elements that are pairs of weak hash values. In other examples, the fingerprint generator 504 creates fingerprints that are sets with elements that are themselves sets other than pairs. In these examples, the elements of a fingerprint may be a single element set or multiple element sets and examples are not limited to a particular number of members within each element of a fingerprint. In addition, according to some examples, the fingerprint generator 504 calculates hash values with hash functions other than weak hash functions. While in other examples, the fingerprint generator 504 employs different hash functions for different location identifiers. Thus examples are not limited to a particular hash function or set of hash functions.

Figure 10:
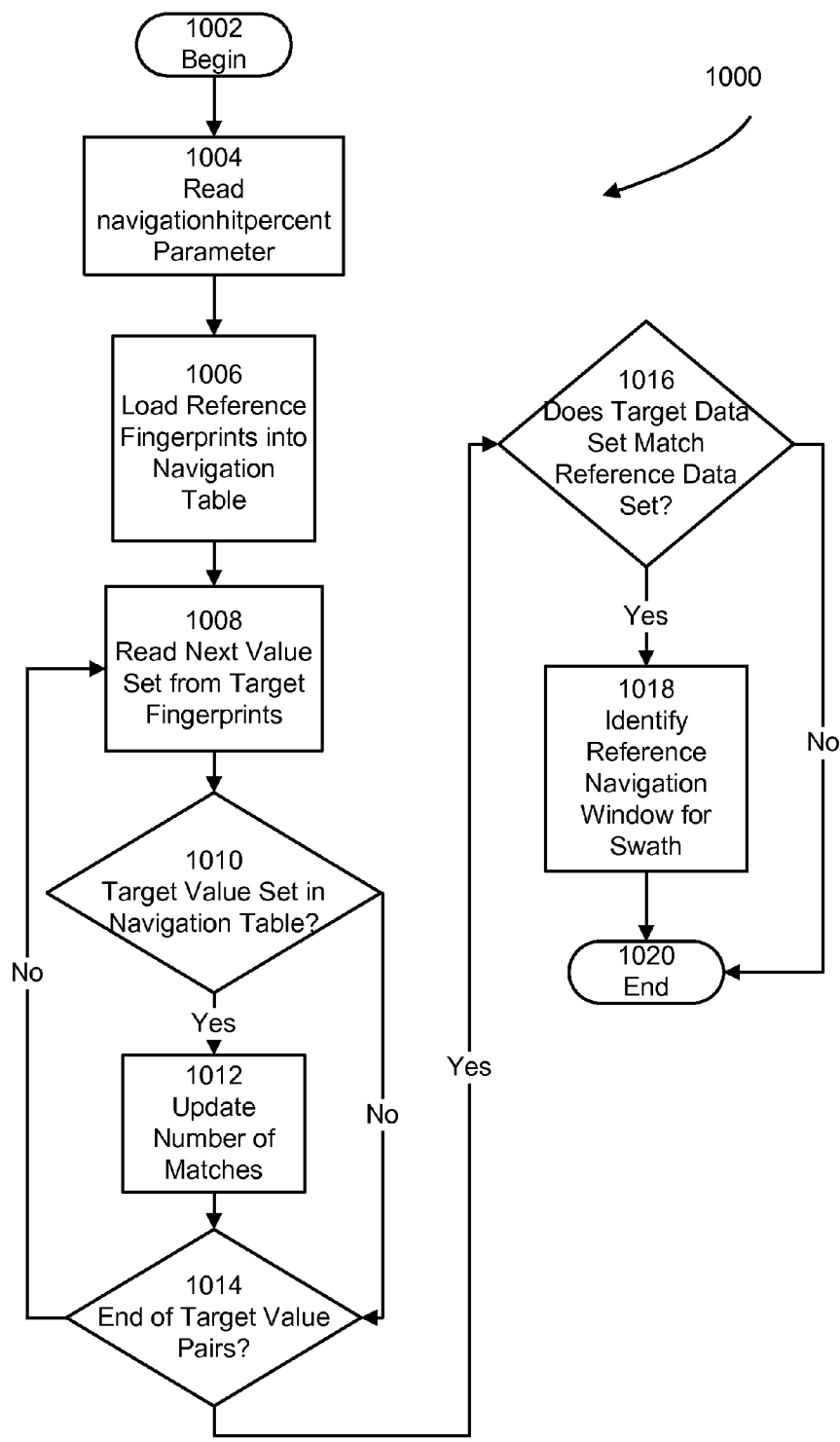
FIG. 10 is a flow diagram of a method for navigating data.

In various examples, the navigator 510 includes elements configured to compare fingerprints associated with different areas of data, such as different navigation windows. In these examples, the navigator 510 uses the result of this comparison to determine when the different areas may contain a sufficient amount of redundant data to warrant further de-duplication processing. In some examples, the navigator 510 is configured to assess the amount of redundant data by comparing the weak hash value pairs included in the fingerprints of both areas. The process that the navigator 510 configures the storage system 170 to execute is illustrated in FIG. 10 which is discussed further below.

For instance, in some examples, the navigator 510 is configured to determine if a reference data set is a match for one or more target data sets. In this example, the navigator 510 is configured to load the fingerprints associated with the reference data set into a navigation table, such as a hash table. According to these examples, the navigator 510 is configured to search the navigation table for fingerprints that are associated with one or more navigation windows disposed within one or more target data sets. In at least one example, the navigator 510 can record the number of target navigation windows that have more than a threshold number of fingerprint elements that match the fingerprint elements associated with the reference data set. In one example, the threshold number is one, but other examples may use other threshold numbers to determine if a target navigation window has a potential match within the reference data set.

Also, in at least one example, the navigator 510 is configured to read a parameter (referred to as the "navigationhitpercent" parameter) that specifies a minimum percentage of target navigation windows (located within a target data set) that must have a potential match within the reference data set for the reference data set to be deemed a match for the target data set. In this example, the navigator 510 is configured to determine that the reference data set is a match for a target data set if the percentage of target navigation windows with matches in the reference data set equals or exceeds the navigationhitpercent parameter. In some examples, the navigator 510 is configured to make this determination for each of a plurality of target data sets prior to comparing the plurality of target data sets to other reference data sets.

In other examples, the navigator 510 is configured to determine an initial location and size for swaths in reference data sets and target data sets that match. In these examples, the navigator 510 is configured to use the navigation table to find navigation windows within reference data sets that match one or more target navigation windows and to assess the quality of the reference navigation windows as a potential reference swath. According to one example, the navigator 510 is configured to determine the quality of a reference navigation window by determining the number of fingerprint element matches that the reference navigation window has with one or more target navigation windows. In this example, the navigator 510 is configured to find matches by looking up (in the navigation table) weak hash value pairs associated with the fingerprint of one or more target navigation windows and tracking which reference navigation window includes a matching weak hash value pair. According to this example, the navigator 510 is configured to assess the quality of a reference navigation window in direct relation to the number of matches, i.e. more match equates to higher quality. By using the navigation table loaded with fingerprints that span the entire reference data set, the navigator 510 is able to locate matches for the target navigation window regardless of the location of the matching data within the reference data set relative to other data.

In some examples, the navigator 510 is configured to inspect reference navigation windows that neighbor a particular reference navigation window when assessing the quality of the particular reference navigation window. In these examples, the navigator 510 is configured to not only assess the number of matches within the particular reference navigation window, but to also to assess the number of matches within reference windows that are either adjacent or near to the particular reference navigation window. Further, according to these examples, the navigator 510 is configured to rate the particular reference navigation window as higher quality if the reference navigation windows that neighbor the particular reference navigation window have fingerprint element matches with one or more target navigation windows. In one example, a reference navigation window is considered to be near to (or neighbor) another reference navigation window if no more than predefined amount of data (for example, one navigation window) is positioned between the two, however examples are not limited to a particular amount of intervening data. This approach has the effect of identifying, as high quality reference navigation windows, areas of the reference data set with a relatively high density of fingerprint element matches to one or more target data sets. According to some examples, the navigator 510 is configured to initially position the reference swath over the highest quality reference navigation window and to position the target swath relative to the one or more target navigation windows with the most corresponding matches.

In some examples, the navigator 510 is configured to adjust the characteristics of the target and reference swaths to enable de-duplication of additional data. For instance, in some examples, the navigator 510 is configured to determine if increasing the size of the swaths by a predefined amount would likely result in the discovery of additional redundant data. According to one example, the navigator 510 is configured to identify target navigation windows located outside, but near, the target swath and to determine if the fingerprint associated with the target navigation windows matches to the fingerprint of a reference navigation window near, or inside, the reference swath. In this example, the navigator 510 is configured to continue seeking matches for fingerprints associated with target navigation windows near the target swath and reference navigation windows near the reference swath until some predetermined number of failures to match occurs (for example, two sequential failures) or until growth of the swaths (target and reference) to include additional data would cause either swath to exceed a maximum swath size parameter.

In summary, according to various examples, the navigator 510 is configured to navigate to areas of redundant data contained within two or more sets of data and position swaths relative to those areas. In these examples, the navigator 510 can navigate data regardless of the source of the fingerprints that characterize the data (including, for example, data that has not been prepared using the data marker 502). As discussed, in these examples, the navigator 510 is configured to utilize prioritized sets of data summaries (such as hash values) that are included within the fingerprints to identify potentially redundant areas of data, even if those areas are located in different positions within the two or more sets of data. In addition, while in some examples the navigator 510 is configured to position a single target swath and a single reference swath, in other examples the navigator 510 is configured to position one or more target swaths and one or more reference swaths. Thus examples disclosed herein are not limited by the number of swaths implemented by the navigator 510 nor by the number of reference data sets or target data sets processed.

According to some examples, the delta differencer 506 includes elements configured to conduct a byte-for-byte de-duplication process of the target swath with reference to the reference swath. In these examples, the delta differencer 506 removes redundant data by replacing redundant data in the target data with indicators to the redundant data in the reference data.

Figure 11:
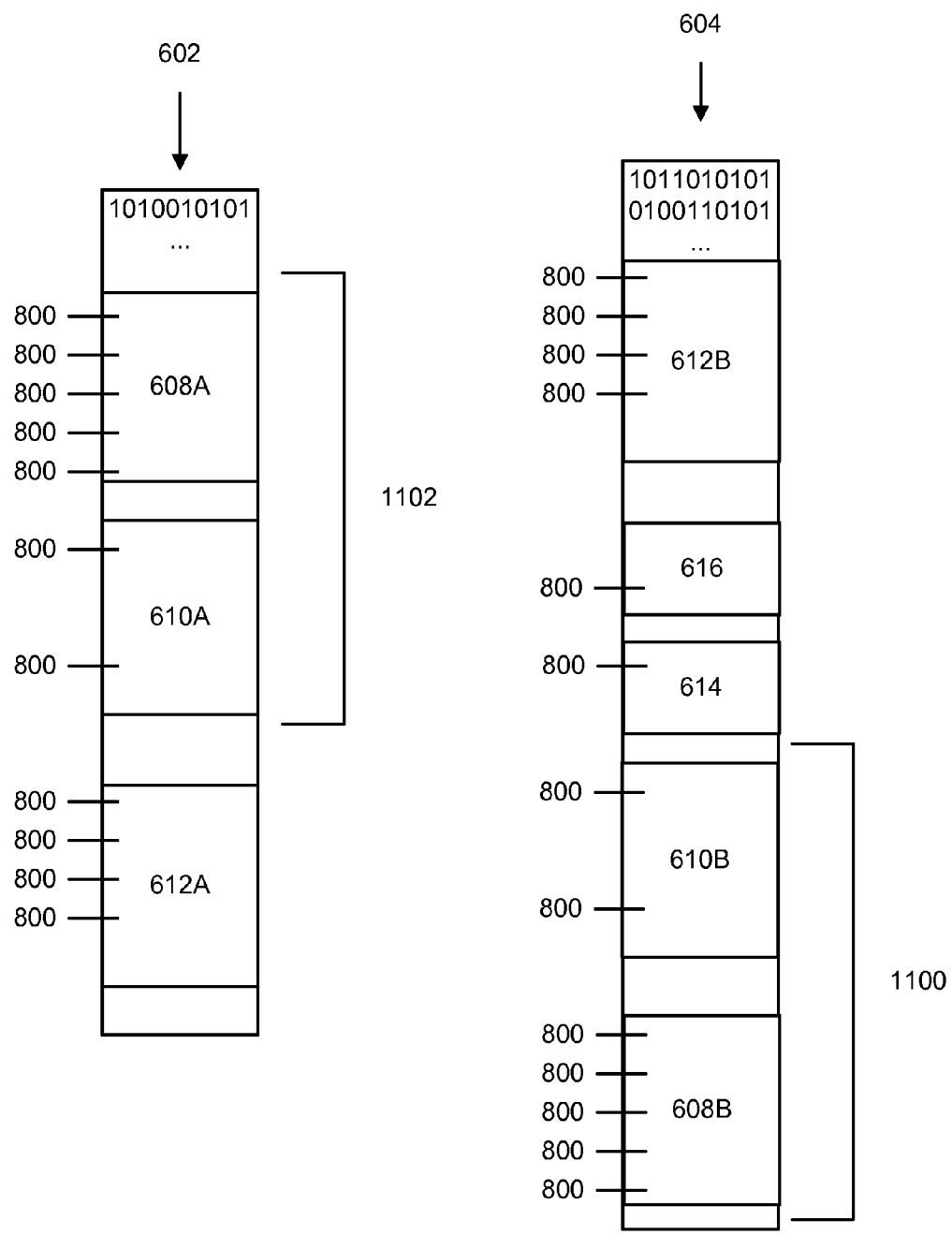
FIG. 11 is a schematic layout of another example of two data sets used in de-duplication processing.

FIG. 11 illustrates the data sets 602 and 604 prior to execution of the byte by byte de-duplication process. FIG. 11 also illustrates a swath 1100, positioned and sized to include the reference region 608B, and a region of target data 1102 which includes the target window 608A. In this example, the storage system 170 is configured to begin byte by byte de-duplication of the target region 1102 using the swath 1100 as a reference.

As discussed above, in some examples, the components 502, 504, 506 and 510 each read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

In other examples, the storage system software 112 may include de-duplication software such as that disclosed in U.S. patent application Ser. No. 12/355,188, entitled "SCALABLE DE-DUPLICATION MECHANISM" and filed on Jan. 16, 2009 which is hereby incorporated by reference in its entirety. In these examples, the storage system software 112 may include a de-duplication director that is configured to direct data to one of a plurality of de-duplication domains based on the characteristics of the data or the presence or absence of specific metadata values associated with the data. According to these examples, the de-duplication techniques employed by the components 502, 504, 506 and 510 may be included in particular de-duplication domains and thus be a subset of the overall de-duplication techniques implemented within the storage system software 112. Thus, as discussed above, examples are not limited to a particular type of data de-duplication.

De-Duplication Processes

Figure 12:
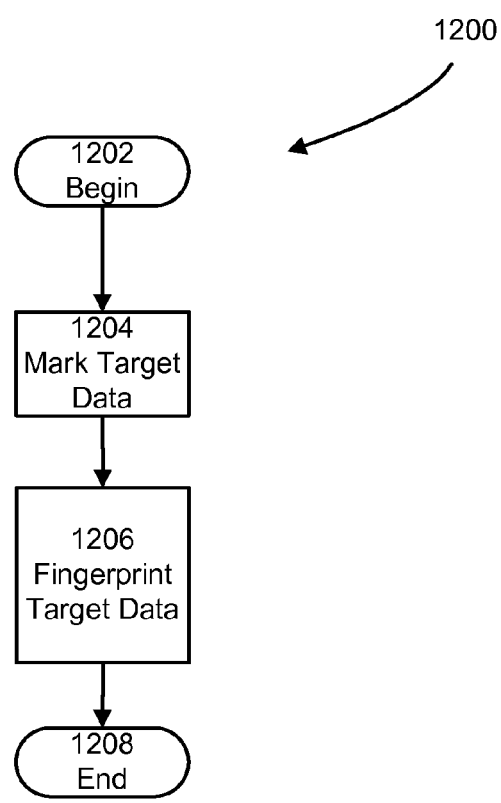
FIG. 12 is a flow diagram of a method for preparing target data.

Various examples provide processes for de-duplicating data using a computer system specially configured to perform the functions disclosed herein. As discussed above with regard to act 204 shown in FIG. 2, various examples provide processes for preparing target data for de-duplication. FIG. 12 illustrates one such process 1200 that may be used to implement act 204 and that includes acts of marking, e.g. recording, location identifiers in the target data and fingerprinting the target data. Process 1200 begins at 1202.

In act 1204, a computer system delineates, or marks, the target data. In one example, the computer system that marks the target data is arranged and configured to execute a data marker 502 as described above with regard to FIG. 5. In this example, the data marker 502 identifies locations within the target data that match predefined criteria and provides location identifiers that identify these locations to the fingerprint generator 504.

FIG. 7 illustrates one example process 700 in accord with act 1204. Process 700 begins at 702. In act 704, a computer system reads the tickhashlength parameter. In act 706, the computer system moves the rolling window by one byte and reads an amount of data equal to the tickhashlength parameter. In act 708, the computer system calculates an XOR hash of this data. In act 710, the computer system determines if the hash meets the predetermined criteria for establishing a location identifier. If so, the computer system records the location identifier in act 712. If not, the computer system determines if the there is more data to process in act 714. If so, the computer system proceeds to act 706. If not, the computer system proceeds to act 716. Process 700 ends at 716.

In act 1206, a computer system fingerprints the target data. In one example, the computer system that performs this comparison is arranged and configured to execute a fingerprint generator 504 as described above. In this example, the fingerprint generator 504 determines, for each target window, a set of weak hash value pairs that include higher weak hash values than other weak hash value pairs associated with location identifiers that fall within the target window. Also, in this example, the fingerprint generator 504 stores the generated fingerprint in the logical metadata cache 508.

FIG. 9 illustrates one example process 900 in accord with act 1206. Process 900 begins at 902. In act 904, a computer system reads the weakhashsize parameter. In act 906, the computer system calculates a weak hash value for data subsequent to each location identifier within a navigation window being fingerprinted. In act 908, the computer system reads the navigationsamples parameter. In act 910, the computer system prioritizes the weak hash values associated with location identifiers in the navigation window. In one example, the weak hash values are placed in a list of descending order according to value. In act 912, the computer system identifies a predefined number of the highest priority weak hash values from the ordered list. In this example, the number of identified weak hash values does not exceed the navigationsamples parameter. Also in act 912, the computer system pairs each identified weak hash value with the weak hash value associated with the location identifier that precedes the location identifier associated with each identified weak hash value (if such exists). In act 914, the computer system builds a fingerprint for the navigation window that includes the highest weak hash value pairs. In act 916, the computer system stores the fingerprint in the logical metadata cache 508. Process 900 ends at 918.

Process 1200 ends at 1208. Rather than establishing a rigid framework within the data used to perform de-duplication, examples in accord with process 1200 prepare the data using a flexible, data driven approach. This data driven approach is more efficient than conventional approaches because it focuses on the areas of data that are most likely to include redundant data.

Figure 13:
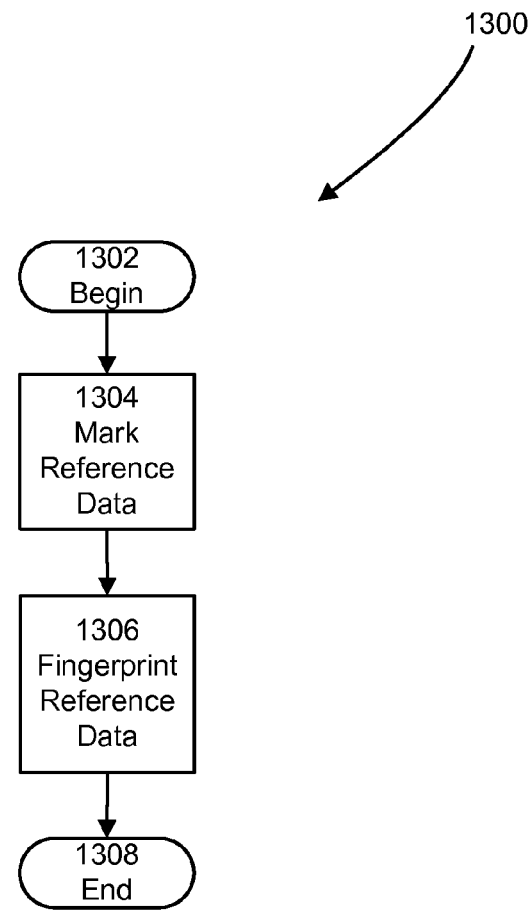
FIG. 13 is a flow diagram of a method for preparing reference data.

As discussed above with regard to act 206 shown in FIG. 2, various examples provide processes for preparing reference data for de-duplication. FIG. 13 illustrates one such process 1300 that may be used to implement act 206 and that includes acts of marking the reference data and fingerprinting the reference data. Process 1300 begins at 1302.

In act 1304, a computer system delineates, or marks, the reference data. In one example, the computer system that marks the reference data is arranged and configured to execute a data marker 502 as described above with regard to FIG. 5. In this example, the data marker 502 identifies locations within the reference data that match predefined criteria and provides location identifiers that identify these locations to the fingerprint generator 504.

FIG. 7 illustrates one example process 700 in accord with act 1304. Process 700 begins at 702. In act 704, a computer system reads the tickhashlength parameter. In act 706, the computer system moves the rolling window by one byte and reads an amount of data equal to the tickhashlength parameter. In act 708, the computer system calculates an XOR hash of this data. In act 710, the computer system determines if the hash meets the predetermined criteria for establishing a location identifier. If so, the computer system records the location identifier in act 712. If not, the computer system determines if the there is more data to process in act 714. If so, the computer system proceeds to act 706. If not, the computer system proceeds to act 716. Process 700 ends at 716.

In act 1306, a computer system fingerprints the reference data. In one example, the computer system that performs this comparison is arranged and configured to execute a fingerprint generator 504 as described above. In this example, the fingerprint generator 504 determines, for each reference portion, a set of weak hash value pairs that include higher weak hash values than other weak hash value pairs associated with location identifiers that fall within the reference portion. Also, in this example, the fingerprint generator 504 stores the generated fingerprint in the logical metadata cache 508.

FIG. 9 illustrates one example process 900 in accord with act 1306. Process 900 begins at 902. In act 904, a computer system reads the weakhashsize parameter. In act 906, the computer system calculates a weak hash value for data subsequent to each location identifier within a navigation window being fingerprinted. In act 908, the computer system reads the navigationsamples parameter. In act 910, the computer system prioritizes the weak hash values associated with location identifiers in the navigation window. In one example, the weak hash values are placed in a list of descending order according to value. In act 912, the computer system identifies a predefined number of the highest priority weak hash values from the ordered list. In this example, the number of identified weak hash values does not exceed the navigationsamples parameter. Also in act 912, the computer system pairs each identified weak hash value with the weak hash value associated with the location identifier that precedes the location identifier associated with each identified weak hash value (if such exists). In act 914, the computer system builds a fingerprint for the navigation window that includes the highest weak hash value pairs. In act 916, the computer system stores the fingerprint in the logical metadata cache 508. Process 900 ends at 918.

Process 1300 ends at 1308. Rather than establishing a rigid framework within the data used to perform de-duplication, examples in accord with process 1300 prepare the data using a flexible, data driven approach. This data driven approach is more efficient than conventional approaches because it focuses on the areas of data that are most likely to include redundant data.

Figure 14:
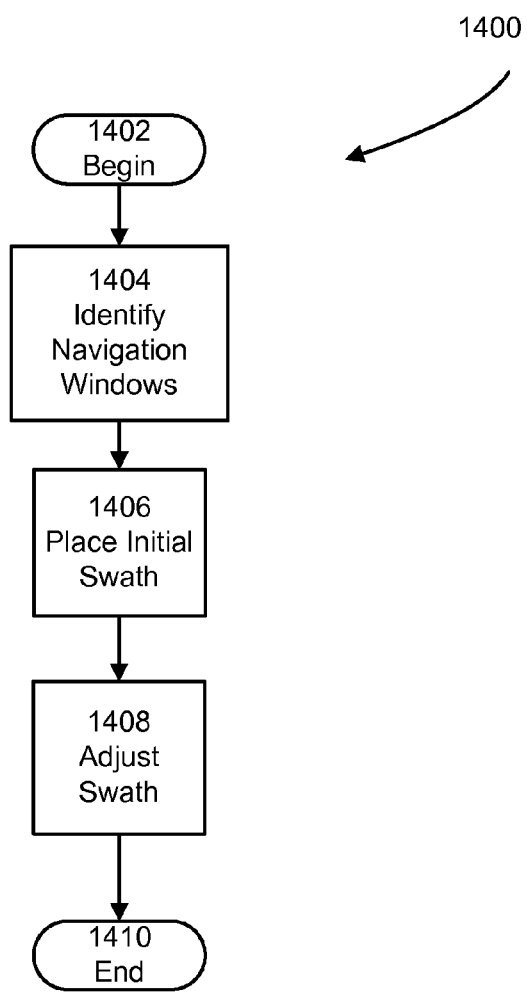
FIG. 14 is a flow diagram of a method for navigating reference data.

As discussed above with regard to act 208 shown in FIG. 2, various examples provide processes for navigating data to determine a satisfactory position for the swaths within the target data and the reference data. FIG. 14 illustrates one such process 1400 that may be used to implement act 208 and that includes acts of identifying navigation windows, placing the swath in relation to the identified navigation windows and adjusting the size of the swath. Process 1400 begins at 1402.

In act 1404, a computer system identifies a reference data set that appears to match a target data set. In one example, the computer system that identifies the data sets is arranged and configured to execute a navigator 510 as described above with regard to FIG. 5. In this example, the navigator 510 finds a reference data set that both contains a predefined minimum number of matches with the target navigation windows included in the target data set. Also, in act 1404, the computer system identifies a potentially high quality reference navigation window within the reference data set.

FIG. 10 illustrates one example process 1000 in accord with act 1404. Process 1000 begins at 1002. In act 1004, a computer system reads the navigationhitpercent parameter. In act 1006, the computer system loads the fingerprints associated with a reference data set into a navigation table. The reference data set may include a plurality of reference navigation windows, each with an individual set of weak hash value pairs within its fingerprint. In act 1008, the computer system reads the next value set (for example, a pair of weak hash values) from the fingerprints associated with a target data set. The target data set may include a plurality of target navigation windows, each having an individual set of weak hash value pairs within its fingerprint. In act 1010, the computer system determines if the target value set is in the navigation table. If so, the computer system increments the number of matches for that navigation table entry in act 1012. If not, the computer system proceeds to act 1014. In act 1014, the computer system determines if there are additional target value sets to process. If so, the computer system proceeds to act 1008. If not, the computer system determines if the target data set matches the reference data set based on the number of target and reference navigation window matches and the navigationhitpercentage parameter in act 1016. If the data sets are a match, the computer system identifies a high quality reference navigation window in act 1018. In this example, the quality of the reference navigation window is based on the number of value set matches that the reference navigation window has with target navigation windows included in the matching target data set and the number of such matches included in neighboring navigation windows. If the data set are not a match, the computer system progress to act 1020. Process 1000 ends at 1020.

A particular example of the result of act 1404 is illustrated with reference to FIG. 11. After act 1404 is complete, the target areas 608A, 610A and 612A are respectively associated with reference areas 608B, 610B and 612B because each reference area is the best match (i.e. has more matching fingerprint weak hash values) for each respective target area. In addition, the target areas 608A and 608B have been identified has the highest quality navigation windows with their respective data sets because of the number of matches they share and the number of matches found in their neighboring navigation windows (610A and 610B, respectively).

In act 1406, a computer system positions the swath to a location based on the quality of the match between the target window and the reference area. In one example, the navigator 510 positions the swath over a reference area that is associated with the target window undergoing de-duplication processing. For example, a computer system executing act 1406 with reference to target window 608A would initially position the swath over reference area 608B, as shown in FIG. 11.

In act 1408, a computer system adjusts the size of the swaths in an attempt to find additional redundant data outside of the target window and reference area. In one example, the computer system analyzes the effect of increasing the size of the swaths until it determines a swath size such that further growth would not resulting in identification of additional redundant data. Continuing the example illustrated by FIG. 11, the computer system may increase the size of the swath 1100 positioned with reference to reference area 608B. As the size of the swath 608B increases, the swath will first encompass reference area 610B. This reference area is associated with (is a high quality match of) target area 610A. Therefore, according to this example, the computer system executing act 1408 would include the reference area 610B in the reference swath 1100 and the target area 610A in the target swath 1102. Also, according to this example, the computer system executing act 1408 would not include reference area 612B in the reference swath 1100 because reference area 612B is too distant from reference navigation windows that include reference areas 608B and 610B (i.e. attempts to grow the swath 1100 would result in sequential failures to find target navigation window matches corresponding to the navigation windows including reference areas 614 and 616.

Process 1400 ends at 1410. Examples in accord with process 1400 result in target and reference swaths that are properly positioned and sized to produce efficient and effective de-duplication processing. Examples in accord with process 1400 provide for a robust, data driven approach to navigating to redundant data contained within two or more sets of data. Thus, process 1400 can navigate data regardless of the source of the fingerprints that characterize the data and, in some examples, a computer system executes process 1400 on data that has not been prepared using the data marker 502. While process 1400 discloses positioning a single target swath and a single reference swath, examples in accord with process 1400 are not limited to a single target swath or a single reference swath and any number of either may be employed. Moreover, examples are not limited to a single target data set or a single reference data set and a plurality of either or both may be used.

Each of the processes disclosed herein depicts one particular sequence of acts in a particular example. The acts included in each of these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. In addition, as discussed above, in at least one example, the acts are performed on a particular, specially configured machine, namely a computer system configured according to the examples disclosed herein.

In general summary, examples and aspects of the disclosed herein include a storage system and methods that de-duplicate data using an approach that adapts to the characteristics of the data being de-duplicated. While the bulk of the specification discusses data de-duplication in the context of a backup storage system, various aspects of the present invention may be used in other contexts, such as de-duplication of primary application data. In addition, while the specification focuses on data sets including a plurality of windows, some examples include data sets which only have one window. Moreover, while the bulk of the specification focuses on weak hash functions and XOR hash functions, many other hash functions are known and may be employed in various examples.

The above-described techniques can be implemented in digital and/or analog electronic circuitry, or in computer hardware, firmware, software, or in combinations THEREOF [of them]. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices, can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

Having thus described several aspects of at least one example of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A computer implemented method of marking data for processing, the method comprising:
   determining a rolling summary that identifies a particular pattern of stored data included in each respective region of a plurality of overlapping regions;
   comparing at least one proper subset of the rolling summary to a predetermined value;
   recording a location identifier that identifies a location within the data where the at east one proper subset equals the predetermined value;
   determining a metric that indicates a frequency with which location identifiers are recorded for the data;
   comparing the metric to a predetermined threshold; and
   adjusting, responsive to the metric transgressing the predetermined threshold, a characteristic of the at least one proper subset.

2. The method according to claim 1, wherein determining the rolling summary includes calculating a hash value from the stored data.

3. The method according to claim 2, wherein calculating the hash value includes calculating a rolling XOR hash value.

4. The method according to claim 3, wherein comparing the at least one proper subset includes comparing the predetermined value to a value derived from 11 bits of the rolling XOR hash value.

5. The method according to claim 4, wherein recording the location identifier includes recording a location of a boundary of a respective region of the plurality of overlapping regions.

6. The method according to claim 1, wherein comparing the at least one proper subset of the rolling summary to a predetermined value includes comparing the entire rolling summary to the predetermined value.

7. The method according to claim 1, wherein determining the metric includes calculating a location identifier rate that equals the number of location identifiers recorded per an amount of the data.

8. The method according to claim 7, wherein ad sting the characteristic of the at least one proper subset includes adjusting the cardinality of the at least one proper subset.

9. A system configured to mark data for processing, the system comprising:
   data storage storing the data, the data including a plurality of overlapping regions; and
   a processor coupled to the data storage and configured to:
      determine a rolling summary of each respective region of the plurality of overlapping regions based on stored data included in each respective region, the rolling summary identifying a particular pattern of the stored data;
      compare at least one proper subset of the rolling summary o a predetermined value;
      record a location identifier that identifies a location within the data where the at least one proper subset equals the predetermined value;
      determine a metric that indicates a frequency with which location identifiers are recorded for the data;
      compare the metric to a predetermined threshold and
      adjust, responsive to the metric transgressing the predetermined threshold, a characteristic of the at least one proper subset.

10. The system according to claim, wherein the processor is configured to determine the rolling summary by calculating a hash value from the stored data.

11. The system according to claim 10, wherein the processor is configured to calculate a hash value by calculating a rolling XOR hash value.

12. The system according to claim 11, wherein the processor is configured to compare the at least one proper subset by comparing the predetermined value to a value derived from 11 bits of the rolling XOR hash value.

13. The system according to claim 12, wherein the processor is configured to record the location identifier by recording a location of a boundary of a respective region of the plurality of overlapping regions.

14. The system according to claim 9, wherein the processor is further configured to compare the at least one proper subset of the rolling summary to a predetermined value by comparing the entire rolling summary to the predetermined value.

15. The system according to claim 9, wherein the processor is configured to determine the metric by calculating a location identifier rate that equals the number of location identifiers recorded per an amount of the data.

16. The system according to claim 15, wherein the processor is configured to adjust the characteristic of the at least one proper subset by adjusting the cardinality of the at least one proper subset.

17. A non-transitory computer readable medium storing computer readable instructions that, when executed by at least one processor, instruct the at least one processor to perform a method of marking data for processing, the method comprising:
   determining a rolling summary that identifies a particular pattern of stored data included in each respective region of a plurality of overlapping regions;
   comparing at least one proper subset of the rolling summary to a predetermined value;
   recording a location identifier that identifies a location within the data where the at least one proper subset equals the predetermined value;
   determining a metric that indicates a frequency with which location identifiers are recorded for the data;
   comparing the metric to a predetermined threshold; and
   adjusting, responsive to the metric transgressing the predetermined threshold, a characteristic of the at least one proper subset.

18. The computer readable medium according to claim 17, wherein the instructions for determining the rolling summary instruct the at least one processor to perform acts including calculating a rolling XOR hash value from the stored data.

19. The computer readable medium according to claim 17 wherein the instructions for recording the location identifier instruct the at least one processor to perform acts including recording a location of a boundary of a respective region of the plurality of overlapping regions.

20. The computer readable medium according to claim 17, wherein the instructions further instruct the at least one processor to perform acts including comparing the at least one proper subset of the rolling summary to a predetermined value by comparing the entire rolling summary to the predetermined value.

* * * * *

UNITED STATES PATENT AND TRADEMARK OFFICE
CERTIFICATE OF CORRECTION

PATENT NO. : 8,495,312 B2  
APPLICATION NO. : 12/877725  
DATED : July 23, 2013  
INVENTOR(S) : Timmie G. Reiter et al.

Page 1 of 1

It is certified that error appears in the above-identified patent and that said Letters Patent is hereby corrected as shown below:

In the Claims:

Column 31, Claim 1, Line 13, delete "east" and insert --least--.

Column 31, Claim 1, Line 14, after the word "value" delete "," and insert --;--.

Column 31, Claim 8, Line 41, delete "ad sting" and insert --adjusting--.

Column 31, Claim 9, Line 55, delete "o" and insert --to--.

Column 32, Claim 10, Line 1, after the word "claim" insert --9--.

Column 32, Claim 19, Line 53, after the number "17" insert --,--.

Signed and Sealed this  
Twelfth Day of November, 2013

Teresa Stanek Rea  
*Deputy Director of the United States Patent and Trademark Office*